United States Patent [19]

Kobayashi et al.

[11] Patent Number: 4,773,274

[45] Date of Patent: Sep. 27, 1988

[54] ELECTROMAGNETIC FLOW METER

[75] Inventors: Tamotsu Kobayashi; Kenichi Kuromori; Shigeru Goto; Yoshinori Matsunaga; Takashi Torimaru; Norihiro Shikuya; Tadashi Azegami, all of Tokyo, Japan

[73] Assignee: Yokogawa Electric Corporation, Tokyo, Japan

[21] Appl. No.: 19,882

[22] Filed: Feb. 27, 1987

[51] Int. Cl.[4] .................................................. G01F 1/60
[52] U.S. Cl. .................................................. 73/861.16
[58] Field of Search ............ 73/861.12, 861.16, 861.17

[56] References Cited

U.S. PATENT DOCUMENTS 4,658,653 4/1987 Tomita ............................ 73/861.17

FOREIGN PATENT DOCUMENTS 507777 4/1976 U.S.S.R. ............................ 73/861.16

Primary Examiner—Charles A. Ruehl
Attorney, Agent, or Firm—Moonray Kojima

[57] ABSTRACT

An electromagnetic flow meter for measuring the flow rate of a fluid by applying to the fluid a magnetic field generated with an exciting current and measuring the resulting signal voltage generated at a pair of electrodes; wherein the exciting current comprises two frequency components which are lower and higher than the usual commercial frequency and the signal voltage comprises two frequencies which are discriminated so that a higher frequency is extracted as a first output and a lower frequency is extracted as a second output, through a low pass filter having a large time constant. A predetermined operation, such as addition, zero correction, response correction, etc, is carried out on the first and second outputs to produce a flow rate output. The invention has quick response, stable zero point and reduced susceptibility to noises.

17 Claims, 24 Drawing Sheets

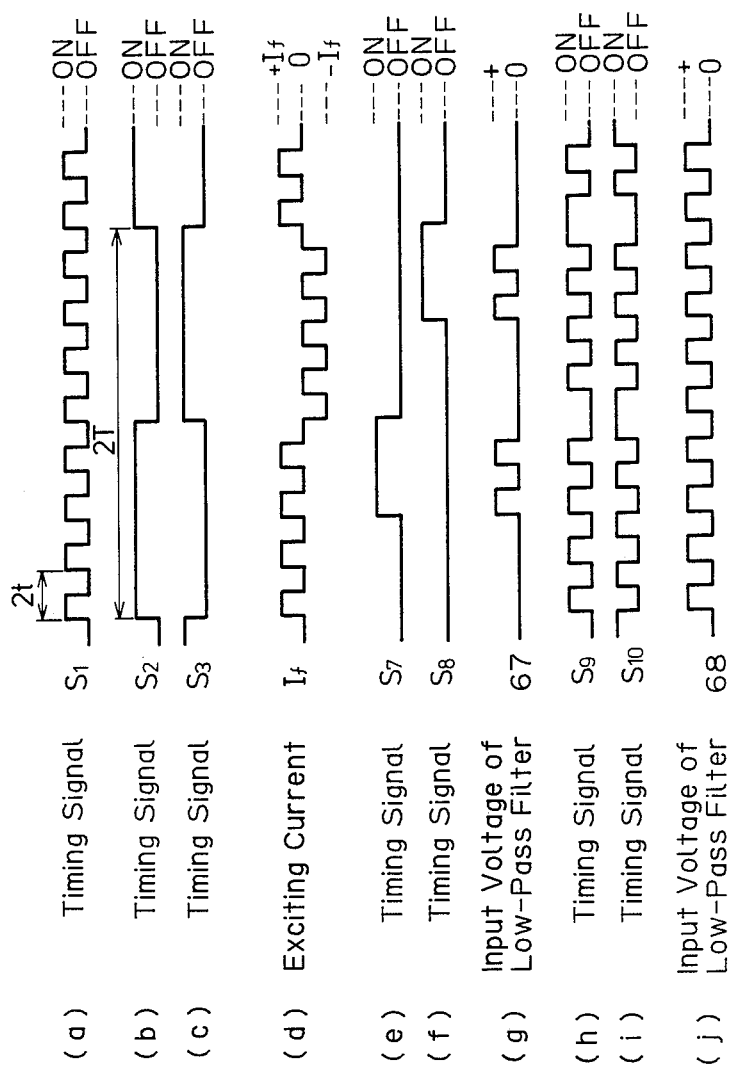

FIG. 20

| $i$ | High-Frequency Demodulation $e_{Hi}$ | High-Pass Filtration $F_{Hi}$ | Low-Frequency Demodulation $e_{Li}$ | Low-Pass Filtration $F_{Li}$ | Addition $e_A$ |
|---|---|---|---|---|---|
| 0 | / | / | $e_{L0}(n) = -L_1(n-2) + 2L_0(n-1) - L_1(n-1)$ | $F_{L0}(n) = F_{L8}(n-1) + B\{e_{L0}(n) - F_{L8}(n-1)\}$ | / |
| 1 | $e_{H1} = H_{13} - H_{14} - H_{15} + H_0$ | $F_{H1} = A(F_{H15} + e_{H15} - e_{H1})$ | / | / | $e_A = F_{H1} + F_{L0}(n)$ |
| 3 | $e_{H3} = H_0 - 2H_1 + H_2$ | $F_{H3} = A(F_{H1} + e_{H3} - e_{H1})$ | / | / | $e_A = F_{H3} + F_{L0}(n)$ |
| 5 | $e_{H5} = H_2 - 2H_3 + H_4$ | $F_{H5} = A(F_{H3} + e_{H5} - e_{H1})$ | / | / | $e_A = F_{H5} + F_{L0}(n)$ |
| 7 | $e_{H7} = H_4 - 2H_5 + H_6$ | $F_{H7} = A(F_{H5} + e_{H7} - e_{H5})$ | / | / | $e_A = F_{H7} + F_{L0}(n)$ |
| 8 | / | / | $e_{L8}(n) = +L_0(n-1) - 2L_1(n-1) + L_0(n)$ | $F_{L8}(n) = F_{L0}(n) + B\{e_{L8}(n) - F_{L0}(n)\}$ | / |
| 9 | $e_{H9} = -H_5 + H_6 + H_7 - H_8$ | $F_{H9} = A(F_{H7} + e_{H9} - e_{H7})$ | / | / | $e_A = F_{H9} + F_{L8}(n)$ |
| 11 | $e_{H11} = -H_8 + 2H_9 - H_{10}$ | $F_{H11} = A(F_{H9} + e_{H7} - e_{H11})$ | / | / | $e_A = F_{H11} + F_{L8}(n)$ |
| 13 | $e_{H13} = -H_{10} + 2H_{11} - H_{12}$ | $F_{H13} = A(F_{H11} + e_{H11} - e_{H13})$ | / | / | $e_A = F_{H13} + F_{L8}(n)$ |
| 15 | $e_{H15} = -H_{12} + 2H_{13} - H_{14}$ | $F_{H15} = A(F_{H13} + e_{H13} - e_{H15})$ | / | / | $e_A = F_{H15} + F_{L8}(n)$ |

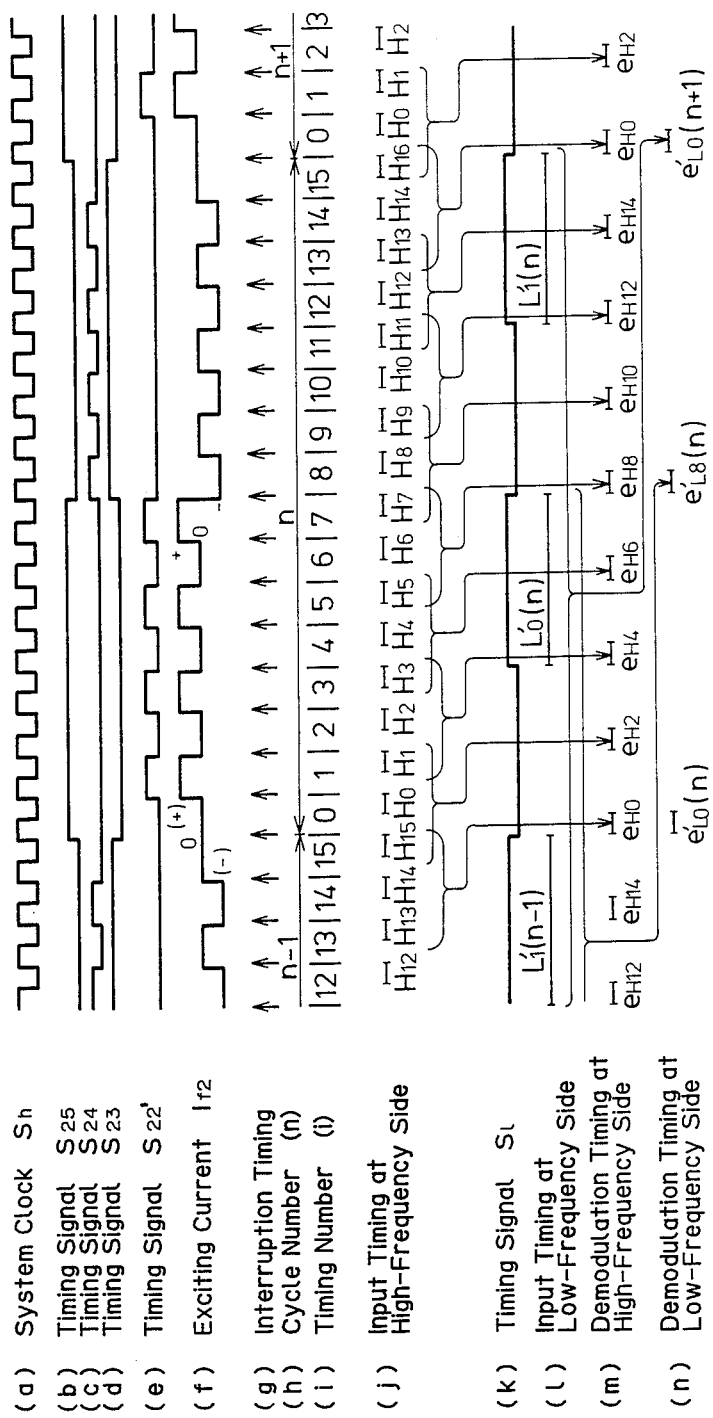

FIG. 22

(a) System Clock $S_h$
(b) Timing Signal $S_{25}$
(c) Timing Signal $S_{24}$
(d) Timing Signal $S_{23}$
(e) Timing Signal $S_{22}'$
(f) Exciting Current $I_{f2}$
(g) Interruption Timing
(h) Cycle Number (n)
(i) Timing Number (i)
(j) Input Timing at High-Frequency Side
(k) Timing Signal $S_L$
(l) Input Timing at Low-Frequency Side
(m) Demodulation Timing at High-Frequency Side
(n) Demodulation Timing at Low-Frequency Side

FIG. 24

| i | High-Frequency Demodulation $e'_{Hi}$ | High-Pass Filtration $F'_{Hi}$ | Low-Frequency Demodulation $e'_{Li}$ | Low-Pass Filtration $F'_{Li}$ | Addition $e_0$ |
|---|---|---|---|---|---|
| 0 | $e_{H0} = 3(H_{13} - 2H_{14} + H_{15})$ | $F_{H0} = A(F_{H14} + e_{H14} - e_{H0})$ | $e'_{L0}(n) = -L'_1(n-2) + 2L'_0(n-1) - L'_1(n-1)$ | $F_{L0}(n) = F_{L8}(n-1) + B(e_{L0}(n) - F_{L8}(n-1))$ | $e_0 = F_{H0} + F_{L0}(n)$ |
| 2 | $e_{H2} = 6(H_{15} - 2H_0 + H_{17})$ | $F_{H2} = A(F_{H0} + e_{H0} - e_{H2})$ | | | $e_0 = F_{H2} + F_{L0}(n)$ |
| 4 | $e_{H4} = 3(H_1 - 2H_2 + H_3)$ | $F_{H4} = A(F_{H2} + e_{H2} - e_{H4})$ | | | $e_0 = F_{H4} + F_{L0}(n)$ |
| 6 | $e_{H6} = 3(H_3 - 2H_4 + H_5)$ | $F_{H6} = A(F_{H4} + e_{H4} - e_{H6})$ | | | $e_0 = F_{H6} + F_{L0}(n)$ |
| 8 | $e_{H8} = 3(H_5 - 2H_6 + H_7)$ | $F_{H8} = A(F_{H6} + e_{H6} - e_{H8})$ | $e'_{L8}(n) = L'_0(n-1) - 2L'_1(n-1) + L'_0(n)$ | $F_{L8}(n) = F_{L0}(n) + B(e_{L8}(n) - F_{L0}(n))$ | $e_0 = F_{H8} + F_{L8}(n)$ |
| 10 | $e_{H10} = 2(H_7 - 2H_8 + H_9)$ | $F_{H10} = A(F_{H8} + e_{H8} - e_{H10})$ | | | $e_0 = F_{H10} + F_{L8}(n)$ |
| 12 | $e_{H12} = 3(H_9 - 2H_{10} + H_{11})$ | $F_{H12} = A(F_{H10} + e_{H10} - e_{H12})$ | | | $e_0 = F_{H12} + F_{L8}(n)$ |
| 14 | $e_{H14} = 3(H_{11} - 2H_{12} + H_{13})$ | $F_{H14} = A(F_{H12} + e_{H12} - e_{H14})$ | | | $e_0 = F_{H14} + F_{L8}(n)$ |

ELECTROMAGNETIC FLOW METER

BACKGROUND OF THE INVENTION

1. Field of Invention

This invention relates to an electromagnetic flow meter for metering the flow rate of a fluid by applying a magnetic field thereto and, more particularly, to such a flow meter having improved excitation and signal processing.

2. Description of the Prior Art

Heretofore, regular commercial power with commercial frequency has been used for excitation of an electromagnetic flow meter. This commercial frequency type exciting method has certain advantages. For example, (a) it has a quick response at reasonable production cost, and (b) it is not substantially susceptible to influences due to random noises (which will hereinafter be referred to as "flow noises") generated in a fluid of slurry or low conductivity and having a frequency increasing with the flow velocity. However, disadvantageously, this method produces fluctuations of the zero point when the flow meter remains in a running state for any relatively long periods of time, e.g. one day.

There also exists a low frequency exciting method wherein the frequency is one-half or lower than the commercial frequency. This low frequency exciting method, advantageously, has a relatively stable zero point. But, disadvantageously, the low frequency is close to the frequency of the flow noises so that susceptibility to influences due to the flow noise is increased, and becomes more pronounced as the flow velocity gets higher. Moreover, damping is needed to reduce flow noise influence and such damping causes delays in response.

Furthermore, recently developed flow meters tend to reduce electric power. This power reduction is now required of two wire type electromagnetic flow meters which conduct power from the source and transmit signals through the two lines. In this case, the electromotive force per unit flow velocity has to be reduced. In the low frequency exciting method, for example, the electromotive force of about 0.5 mV/m/s is reduced to 10 mV/m/s for the two line type. If the electromotive force generated is made lower by one order or more than that of the prior art, the influences due to the flow noises will be relatively augmented and hence require raising of the limit to the power economy of the low frequency excitation method.

Thus, to summarize, excitation using commercial frequency is advantageous in that quick response is obtained and there is low susceptibility to flow noises. On the other hand, use of commercial frequency excitation produces an unstable zero point. Using low frequency excitation gives a stable zero point, but is more susceptible to influences due to flow noises. Thus, as can be appreciated, adoption of either prior methods is accompanied by problems.

SUMMARY OF THE INVENTION

An object of the invention is to provide an electromagnetic flow meter which has a quick response to changes in flow rate, has a stable zero point, and is not substantially susceptible to influences due to flow noises.

The invention encompasses an electromagnetic flow meter comprising exciting means for supplying a magnetic field having two different frequencies, i.e. a first frequency and a second frequency which is lower than the first frequency; first demodulating means for discriminating the signal voltage, which is excited by the exciting means and generated in accordance with the flow rate, on the basis of the first frequency to generate a first output; second demodulating means for discriminating the signal voltage on the basis of the second frequency; and low pass filtering means for low pass filtering the output of the second demodulating means with a large time constant to generate a second output, whereby a flow rate output is generated by executing a predetermined operation (e.g. addition, zero correction, response correction, etc) with the first and second outputs.

BRIEF DESCRIPTION OF THE DRAWINGS

FIG. 9, comprising lines (a)–(j), is a waveform chart for explaining operation of FIG. 8.

FIG. 20 is a table showing operation of the flow chart of FIG. 19.

FIG. 22, comprising lines (a)-(n), is a timing chart for explaining operation of an embodiment having an excitation waveform different from that used in FIG. 17.

FIG. 24 is a table showing the operation of the flow chart of FIG. 23.

DESCRIPTION OF PREFERRED EMBODIMENTS

Figure 1:
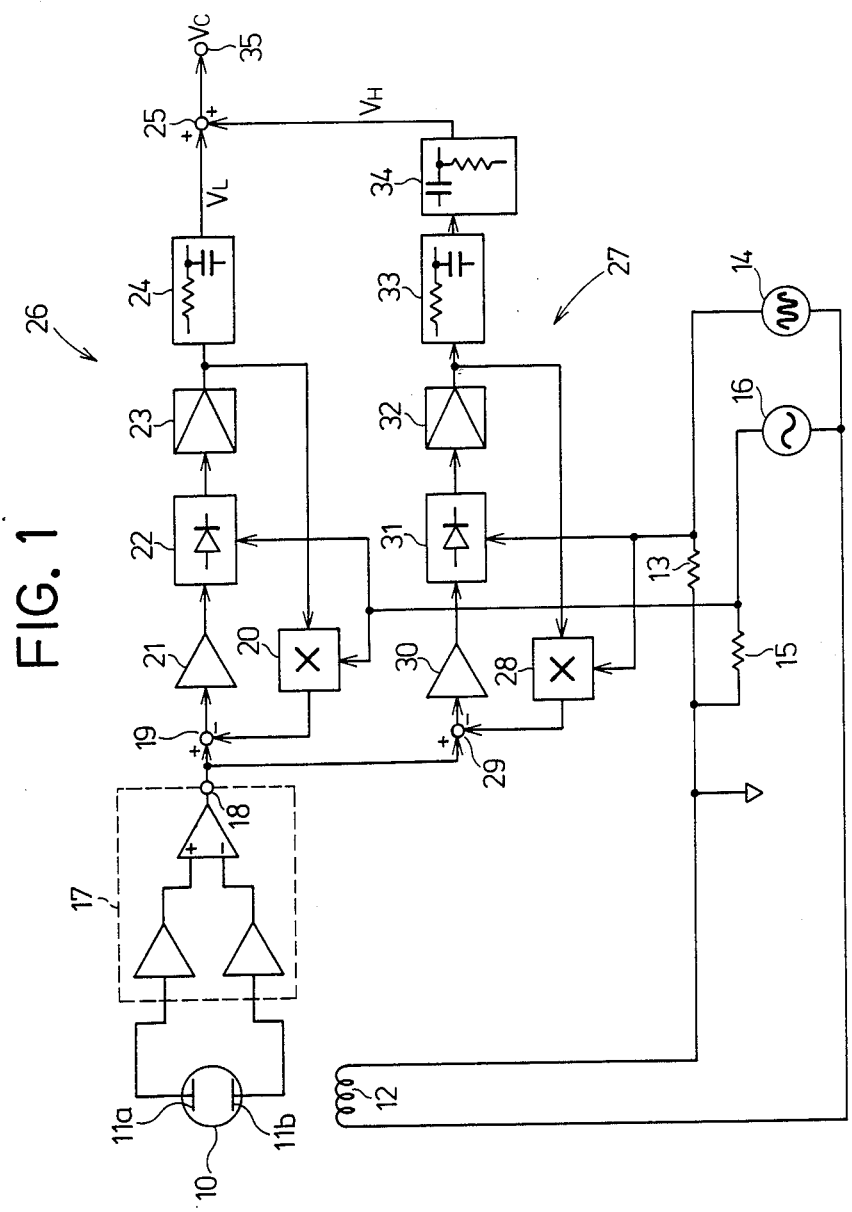
FIG. 1 is a block diagram depicting a first illustrative embodiment of the invention for excitation on the basis of a commercial frequency.

FIG. 1 depicts circuitry for exciting an electromagnetic flow meter on the basis of commercial frequency. In the embodiment, a feedback loop is provided comprising a converter of an electromagnetic flow meter at each of high frequency and low frequency sides. The inventive arrangement comprises a measuring tube 10 of a detector of the flow meter, which has its inner face lined with an insulating material; electrodes 11a, 11b for detecting a signal voltage; and an exciting coil 12 for generating a magnetic field, which is applied to a fluid to be measured. Exciting coil 12 is supplied with a constant current of commercial frequency from a commercial constant current source 14 and further in a superposed manner with a constant current of a low frequency of about 50/8 Hz from a low frequency constant current source 16. As a result, a magnetic field having two kinds of frequencies, e.g. a commercial frequency and a one-eighth frequency, is applied to the fluid to be measured. The one-eighth frequency is one-eighth that of the commercial frequency.

On the other hand, the signal voltage is detected at the electrodes 11a, 11b and is supplied to a pre-amplifier 17. Pre-amplifier 17 conducts elimination of the common node voltage and conversion of the impedance and outputs the signal voltage from its output terminal 18 to a node 19. The node 19 actually represents a combination of an operational amplifier and a resistor network, but a simplified expression is used herein for sake of convenience.

At node 19, a deviation is taken from the outputs of pre-amplifier 17 and a multiplier 20 and is amplified by an amplifier 21. This deviation is synchronously rectified by a demodulator 22 including a low pass filter having a small time constant. The DC output thus smoothed is converted into a pulse frequency signal having a constant pulse width by a voltage/frequency converter 23 and is fed back to multiplier 20 and also supplied to a low pass filter 24, in which it is smoothed to output its output $V_L$ to an addition node 25. Multiplier 20 is constructed of a switch, for example. This switch has one terminal fed with a reference voltage of a low frequency generated at the two terminals of resistor 15 so that it is turned ON or OFF by the output pulses of voltage/frequency converter 23, and outputs a voltage from another terminal to node 19. On the other hand, comparison voltage of a low frequency is applied from resistor 15 to demodulator 22.

Amplifier 21, demodulator 22, voltage/frequency converter 23, low pass filter 24 and multiplier 20 considered together constitute a low frequency signal processing unit 26 for processing a low frequency signal voltage. This unit 26 processes one of the flow rate signals on the fluid, which corresponds to the low frequency excitation, and outputs the processed signal as output $V_L$ to addition node 25. In the time constant of low frequency signal processing unit 26, the time constant of low pass filter 24 is increased, and the response is delayed.

Between output terminal 18 of pre-amplifier 17 and addition node 25, on the other hand, there is connected a commercial frequency signal processing unit 27 in parallel with low frequency signal processing unit 26.

The deviation between the output voltage at output terminal 18 of pre-amplifier 17 and the output voltage of multiplier 28 is taken at node 29 and is amplified by amplifier 30. The output of amplifier 30 is either synchronously rectified by a demodulator 31 by using a commercial frequency comparison voltage generated at resistor 13 as a reference voltage or sample-held into a smoothed DC voltage. The DC voltage is converted by a voltage/frequency converter 32 into a pulse frequency signal having a constant pulse width and is fed back to multiplier 28. The output voltage of voltage/frequency converter 32 is smoothed into a DC voltage by a low pass filter 33. The DC voltage is then outputted as an output $V_H$ through a high pass filter 34 to addition node 25. Addition node 25 adds the outputs $V_L$ and $V_H$ and outputs a composed output $V_C$ to an output terminal 35.

With this construction, in the case of the normal operation of low flow rate fluctuations, the commercial frequency signal processing unit 27 does not respond because of the existence of high pass filter 34, and the output $V_L$ of the low frequency signal processing unit 26 having a stable zero point is mainly outputted as the composed output $V_C$. On the other hand, influences due to fluid noises are reduced because of the presence of low pass filter 24 having a large time constant selected so that they do not appear as fluctuations of output $V_L$. Since commercial frequency signal processing unit 27 has a high excitation frequency, moreover, a difference from the frequency of the flow noises existing in the low frequency region is so significant that no influences appear in output $V_H$.

In other words, in the case of normal operation of less flow rate fluctuations, it is possible to provide an electromagnetic flow meter which is not substantially susceptible to influences due to flow noises while assuring a stable zero point.

Next, in case flow rate abruptly changes, low frequency signal processing unit 26 does not respond because of the large time constant of low pass filter 24, but the commercial frequency signal processing unit 27 instantly responds to output the output $V_H$ as the composed output $V_C$ because it has a small time constant and outputs via high pass filter 34.

In the case of a zero flow rate, on the other hand, flow noises are not generated and hence exert no influence. As a result, the commercial frequency signal processing unit 27 has its zero point which does not drift and its output $V_H$ is maintained at zero because of the presence of high pass filter 34 so that output $V_L$ of low frequency signal processing unit 26 having the stable zero point is outputted as the composed output $V_C$.

If the amplification gain of the entire low frequency signal processing unit 26 and the amplitude degree of the entire commercial frequency signal processing unit 27 are made substantially equal, and if the time constant of the entire low frequency signal processing unit 26 for the low pass filtration and the time constant of the entire commercial frequency unit 27 for the high pass filtration are made substantially equal, the response of the composed output $V_C$ to abrupt changes in a steady flow rate becomes monotonous.

Figure 2:
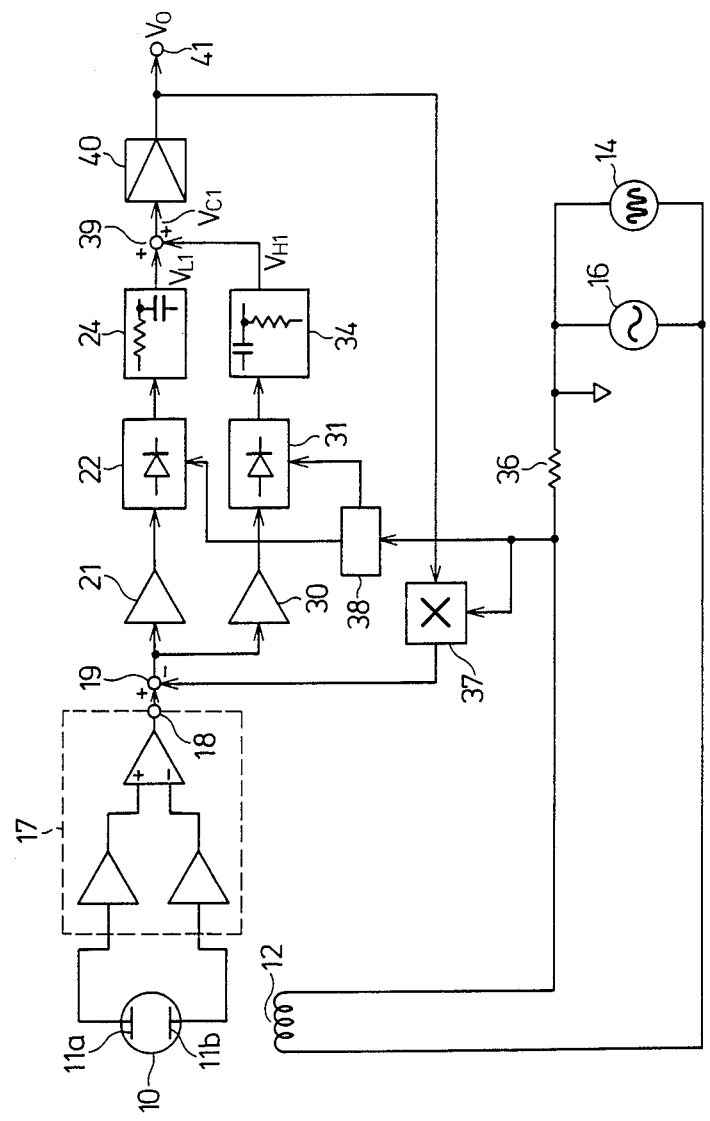
FIG. 2 is a block diagram depicting a second illustrative embodiment wherein a flow rate signal feedback method is changed from that used in FIG. 1.

FIG. 2 is a modification of FIG. 1 and uses an identical feedback loop of the converter of the flow meter. In the description below, identical parts have identical numerals and descriptions thereof are omitted.

The respective constant currents from low frequency constant current source 16 and commercial constant current source 14 are supplied via a resistor 36 to exciting coil 12 so that a comparison voltage having composite low and commercial frequency is generated at resistor 36.

On the other hand, a deviation is taken at node 19 from the outputs of pre-amplifier 17 and multiplier 37 and is inputted to both amplifiers 21 and 30. The output of amplifier 21 has only its low frequency component separated by a frequency separator 38 and is inputted as a comparison voltage to demodulator 22 so that a DC flow rate signal corresponding to the low frequency excitation is generated at the output terminal of demodulator 22. This flow rate signal is outputted as an output $V_{L1}$ via low pass filter 24 to an addition node 39. The output of amplifier 30 has only its commercial frequency component separated by frequency separator 38 and is inputted as a comparison voltage to demodulator 31 so that a DC flow rate signal corresponding to the commercial frequency excitation is generated at the output terminal of demodulator 31. The flow rate signal is outputted as an output $V_{H1}$ via high pass filter 34 to addition node 39.

An output $V_{C1}$ composed additionally of outputs $V_{L1}$ and $V_{H1}$ at the addition node 39 is converted by a voltage/frequency converter 40 into a pulse train having a variable duty of a constant pulse width and is fed back to multiplier 37 so that an output $V_O$ is outputted to output terminal 41. Multiplier 37 is constructed of a switch or the like, which is turned ON or OFF by the output pulse of voltage/frequency converter 40 to feed back the comparison voltage of composite frequency generated at the two terminals of resistor 36 to node 19.

Similar operations to those of FIG. 1 are attained by selecting a large time constant of low pass filter 24.

Figure 3:
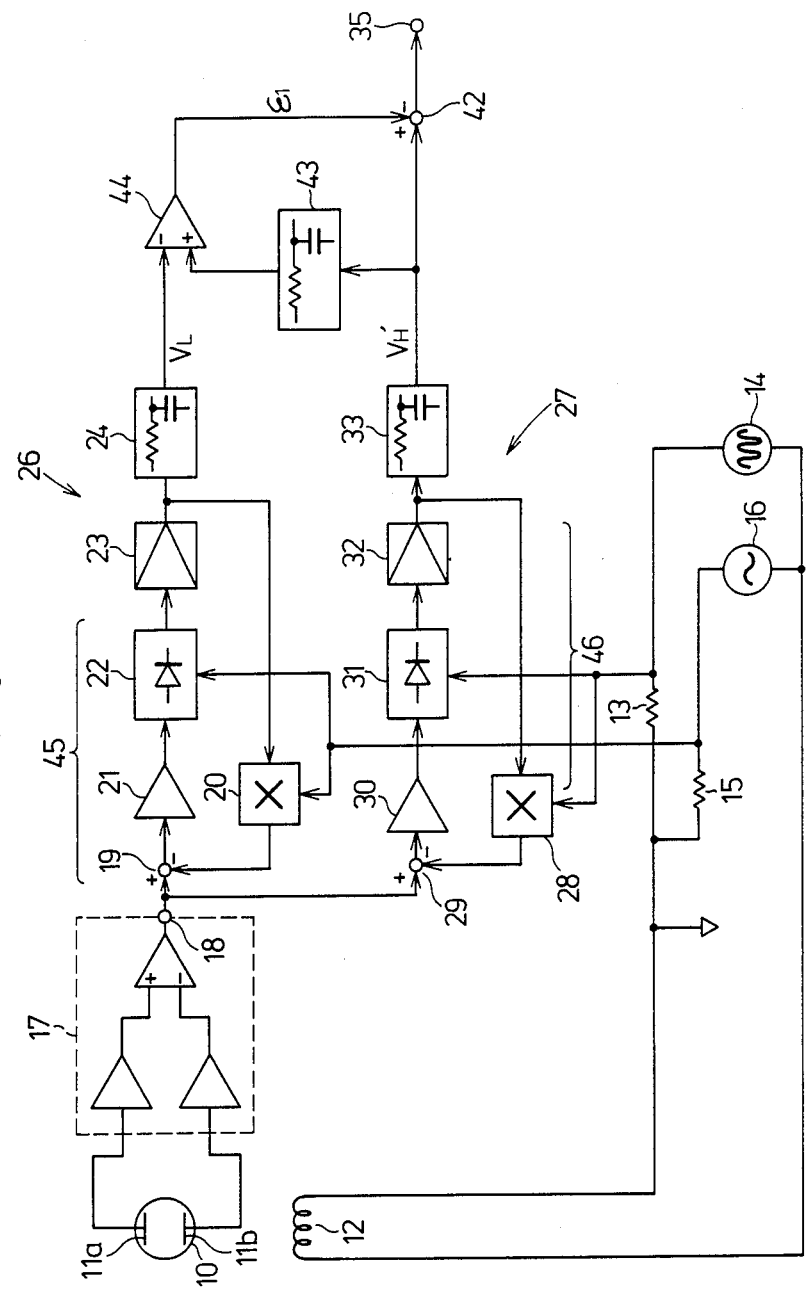
FIG. 3 is a block diagram depicting a third illustrative embodiment for compensating a zero point on the basis of a commercial frequency signal processing.

In FIG. 3, stability of the zero point is ensured by using commercial frequency unit 27 as a base and by adding thereto a low frequency zero detector. The output $V_H'$ of low pass filter 33 of commercial frequency unit 27 is outputted to a zero correcting node 42 and also to a low pass filter 43.

The output of low pass filter 43 is applied to a non-inverting input terminal (+) of a zero detecting amplifier 44. The output of low pass filter 24 is applied to the inverting input terminal (−) of amplifier 44. The deviation of the outputs is calculated by zero detecting amplifier 44. As a result, zero detector 44 generates at its output terminal a zero signal $\epsilon_1$ corresponding to the shift of the zero point of high frequency signal processing unit 27. Zero correcting node 42 conducts a subtraction of the output $V_H'$ and the zero signal $\epsilon_1$ and outputs the subtracted output to output terminal 35.

Low pass filter 43 has its time constant selected at a large value conforming to that of low pass filter 24 selected at the high value so that it may have a responding rate equal to that of low pass filter 24.

It is necessary to give a common amplification gain to amplifying unit 45, which comprises amplifier 21, demodulator 22, voltage-frequency converter 23 and multiplier 20; and to amplifying unit 23 which comprises amplifier 30, demodulator 31, voltage/frequency converter 32 and multiplier 28.

Amplifying unit 46 is not susceptible to influences due to flow noises and has a quick response. However, it has slow fluctuations of its zero point because it processes commercial frequency signals. On the other hand, amplifying unit 45 is susceptible to influences due to flow noises and is stable in its zero point because it processes low frequency signals. However, the flow noises exhibit no influence upon the output of low pass filter 24 because filter 24 has a large time constant. As a result, the deviation between the output obtained by passing the output of amplifying unit 46 through low pass filter 43 having the large time constant and the output of low pass filter 24 is calculated by zero detecting amplifier 44, whereby zero signal $\epsilon_1$ indicating the displacement of the zero point, which is generated by the amplifier unit 46, appears at the output of zero detecting amplifier 44 in a slow response.

On the other hand, both the signal of commercial frequency signal processing unit 27 having a fluctuating zero point and a quick response and the zero signal $\epsilon_1$ corresponding to the fluctuations of the zero point are inputted to zero correcting node 42, in which a subtraction of these signals is made, so that a flow rate signal is obtained having a quick response and without any flow noise and having its zero point fluctuations eliminated.

Figure 4:
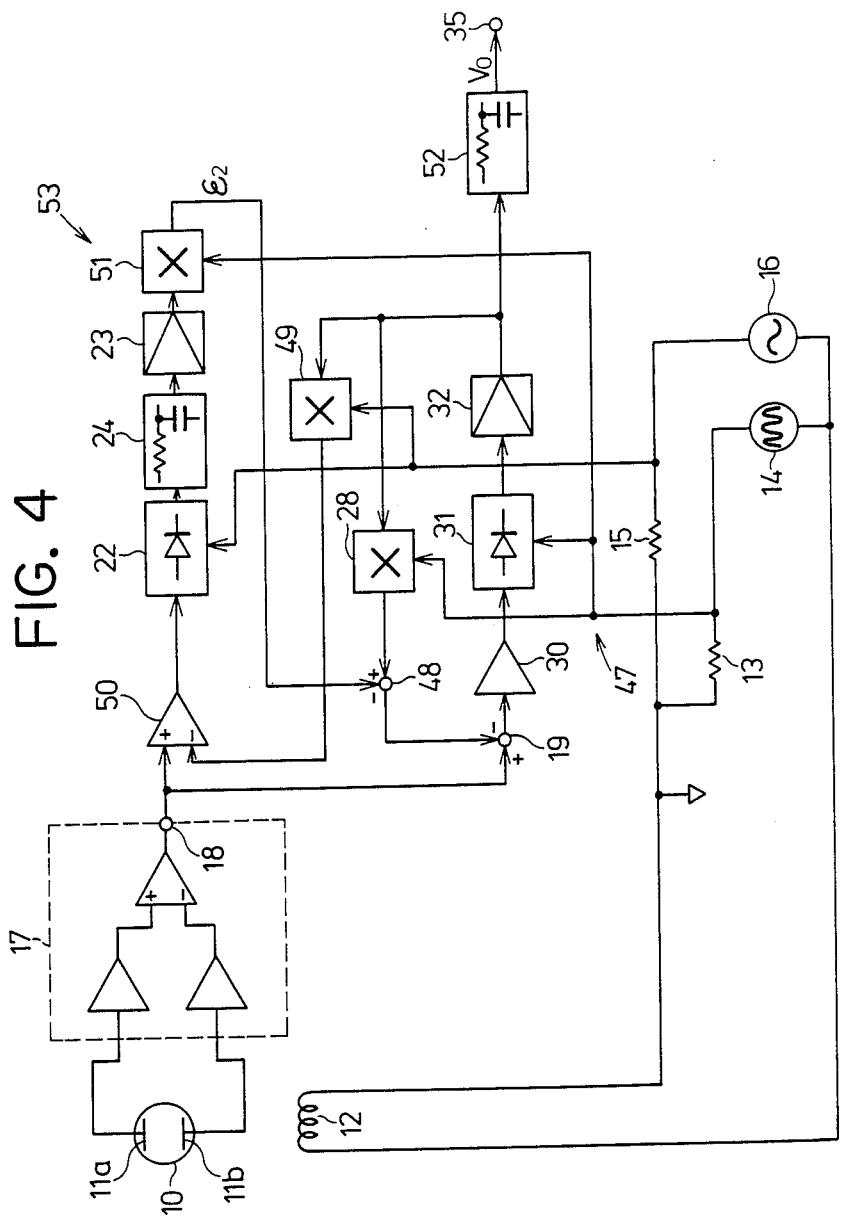
FIG. 4 is a block diagram depicting a fourth illustrative embodiment for simplifying the construction of FIG. 3.

FIG. 4 embodiment eliminates the need for identical overall gains and linearities of amplifier units 45,46, as in FIG. 3, and this simplifies the arrangement. In FIG. 4, amplifier unit 47 comprises amplifier 30, demodulator 31, voltage/frequency converter 32, multiplier 28 and zero correcting node 48. Zero correcting node 48 is supplied with the output from multiplier 28 and a zero signal $\epsilon_2$, and the difference is taken at zero correcting node 48 and is outputted to node 19.

Multiplier 49 is supplied with the output from voltage/frequency converter 32 and the low frequency comparison voltage of resistor 15 and applies the low frequency modulated voltage modulated with that comparison voltage to the inverted terminal (−) of differential amplifier 50. Amplifier 50 takes the difference between the modulated voltage and the output from pre-amplifier 17 (supplied to the non-inverted (+) input terminal) and outputs it to demodulator 22. Since demodulator 22 is supplied with low frequency comparison voltage from resistor 15, it generates at its output a DC voltage corresponding to the low frequency component of the signal voltage. The DC voltage is converted into a frequency by converter 23 via low pass filter 24 having a large time constant, and commercial frequency comparison voltage from resistor 13 is modulated with that frequency by a multiplier 51 and is outputted as zero signal $\epsilon_2$, indicating the fluctuations of the commercial frequency zero point, at zero correcting node 48. At zero correcting node 48, zero signal $\epsilon_2$ modulated into the commercial frequency is subtracted from the commercial frequency output of multiplier 28 so that a flow rate signal, having its zero point corrected through a low pass filter 52, is obtained at output terminal 35.

Differential amplifier 50, demodulator 22, low pass filter 24, voltage/frequency converter 23, multiplier 51 considered together constitute a zero detector 53.

Since zero detector 53 is used only for suppressing the zero point and operates as a kind of deviation amplifier in its entirety, the linearity is not important. Since the zero point in the commercial frequency usually fluctuates slowly, moreover, zero detector 53 can have a slow response and can smooth the flow noises.

Figure 5:
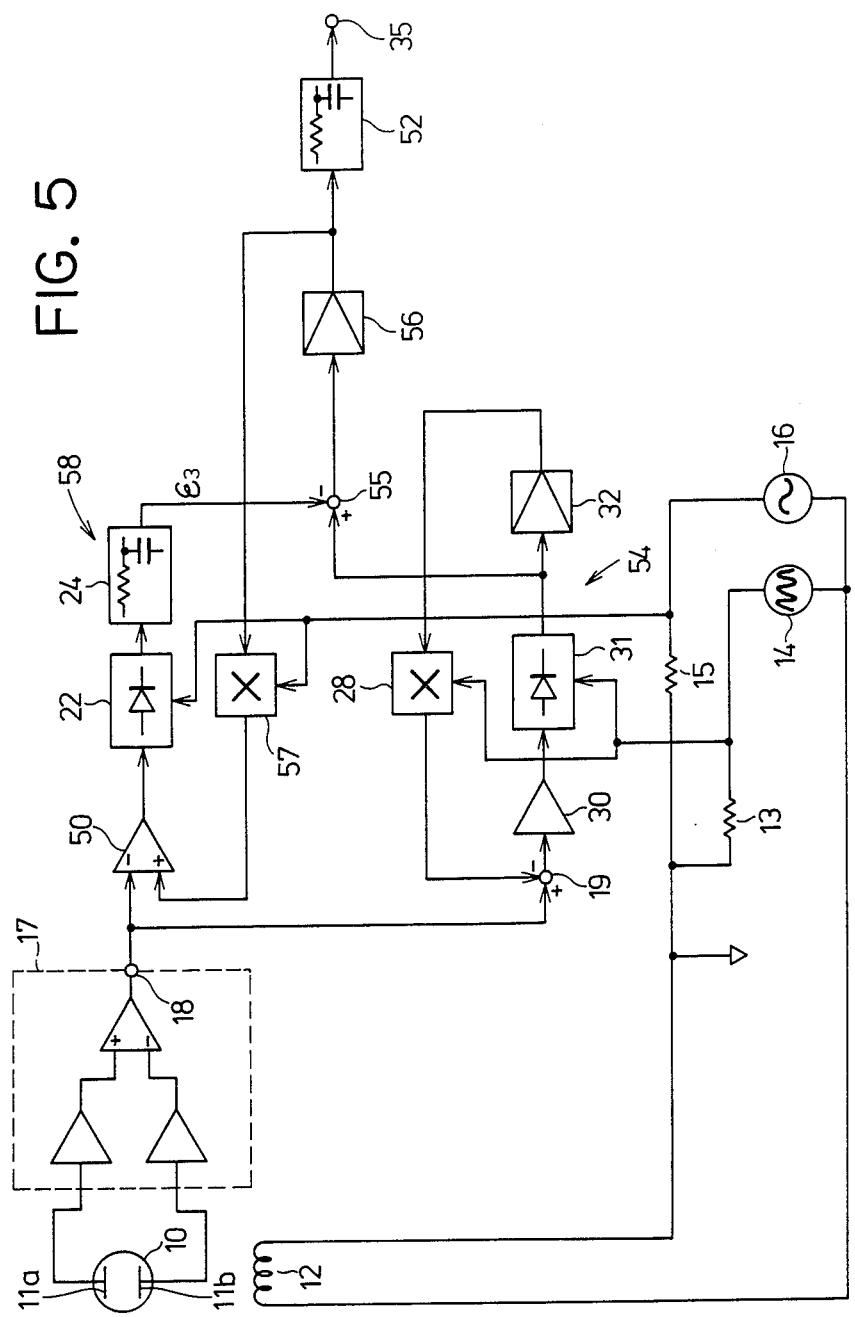
FIG. 5 is a block diagram depicting a fifth illustrative embodiment for changing the correction point of a zero signal with respect to FIG. 4.

FIG. 5 is a modification of FIG. 4 wherein the correction node of zero signal $\epsilon_2$ is changed. The output of demodulator 31 of amplifier unit 54 and a zero signal $\epsilon_3$ are inputted to a zero correction node 55, at which they are subtracted so that the resultant signal is outputted to a voltage/frequency converter 56. Converter 56 has its amplification degree selected to be equal to that of converter 32.

Multiplier 57 is supplied with output from converter 56 and low frequency comparison voltage from resistor 15 and applies a low frequency voltage modulated with the comparison voltage to the inverted terminal (−) of differential amplifier 50. Amplifier 50 takes a deviation between the modulated voltage and the output from pre-amplifier 17 (supplied to the non-inverted (+) terminal) and outputs it to demodulator 22. Demodulator 22 outputs a DC voltage corresponding to the low frequency component of signal voltage as zero signal $\epsilon_3$ to zero correcting node 55.

Zero detector 58 comprises multiplier 57, differential amplifier 50, demodulator 22 and low pass filter 24.

Figure 6:
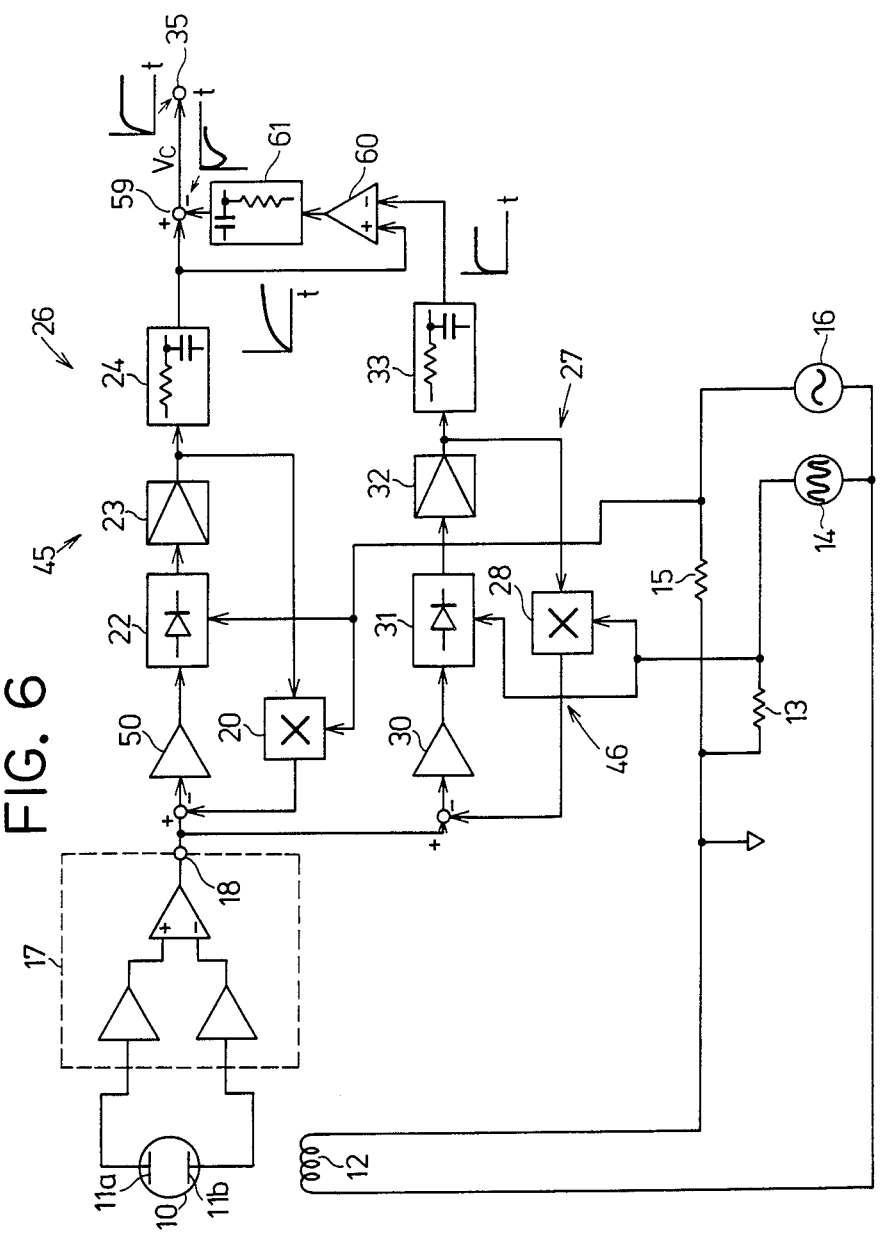
FIG. 6 is a block diagram corresponding to FIG. 3 and depicting a sixth illustrative embodiment wherein a low frequency signal processing unit and a commercial frequency signal processing unit are used with improved response characteristics.

FIG. 6 depicts a low frequency signal processing unit used as a main part to have its responding characteristic improved, and oppositely to FIG. 3, wherein the commercial frequency signal processing unit is used as the main part.

The output of low pass filter 24 of the stable zero point of low frequency signal processing unit 26 is outputted to a response correcting node 59 and is applied to the non-inverting terminal (+) of response detecting amplifier 60. Amplifier 60 has its inverting (−) terminal supplied with output from unit 27 having a quick response and takes a deviation from the output thereof and the output of low pass filter 24 and outputs it via a high pass filter 61 to response correcting node 59.

Response correcting node 59 conducts a subtraction between the outputs of high pass filter 61 and low pass filter 24 and outputs it to output terminal 35. The output of low frequency signal processing unit 26 has a stable zero point and exhibits a slow response. On the other hand, the output of commercial frequency signal processing unit 27 has an unstable zero point and exhibits quick response. As a result, the output obtained by taking a deviation between the outputs of low pass filter 24 and low pass filter 33 at response detecting amplifier 60 contains a DC component, but the response compensating signal $V_C$ obtained by passing the DC component through high pass filter 61 does not contain any DC component and has a non-deteriorated zero stability and a quick response. Thus, the output of response correcting node 59 compensates the slow response of low pass filter 24 with the response compensating signal $V_C$ so that it has a quick response and a stable zero point.

Figure 7:
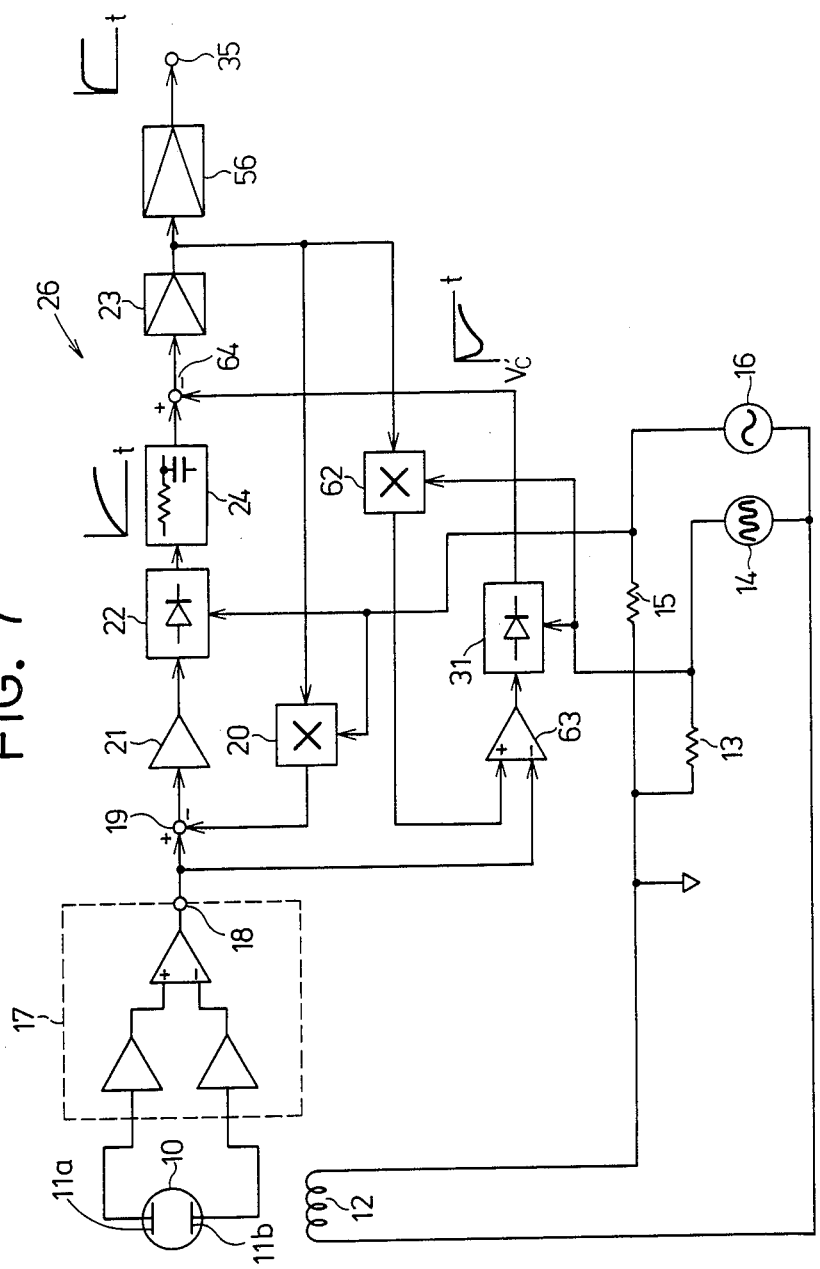
FIG. 7 is a block diagram depicting a seventh illustrative embodiment which is an improvement of FIG. 6 and corresponds to FIG. 4.

FIG. 7 mainly comprises a low frequency signal processing unit and corresponds to FIG. 4 which mainly comprises commercial frequency signal processing unit.

A multiplier 62 is supplied with the output from converter 23 and modulates it with the commercial frequency comparison voltage obtained at resistor 13 and outputs the modulated output to the non-inverted terminal (+) of response detecting amplifier 63. This amplifier 63 calculates and outputs the deviation between the modulated output applied to the non-inverted terminal (+) and the output of pre-amplifier 17 which is supplied to the inverted terminal (−) of amplifier 63. The output of amplifier 63 is demodulated by demodulator 31 with commercial frequency comparison voltage obtained at resistor 13 so that a response compensating signal $V_{C'}$ of the signal voltage corresponding to the commercial frequency component is outputted to a response correcting node 64.

The low frequency output of low pass filter 24 is applied to node 64 and has its response corrected with the response compensating signal $V_{C'}$ until it is outputted to converter 23. If signal $V_{C'}$ is thus applied to the inside of low frequency signal processing unit 26, the amplification degree of the response detector comprising response detecting amplifier 63, demodulator 31, multiplier 62, etc, causes no error even when it is stable.

Figure 8:
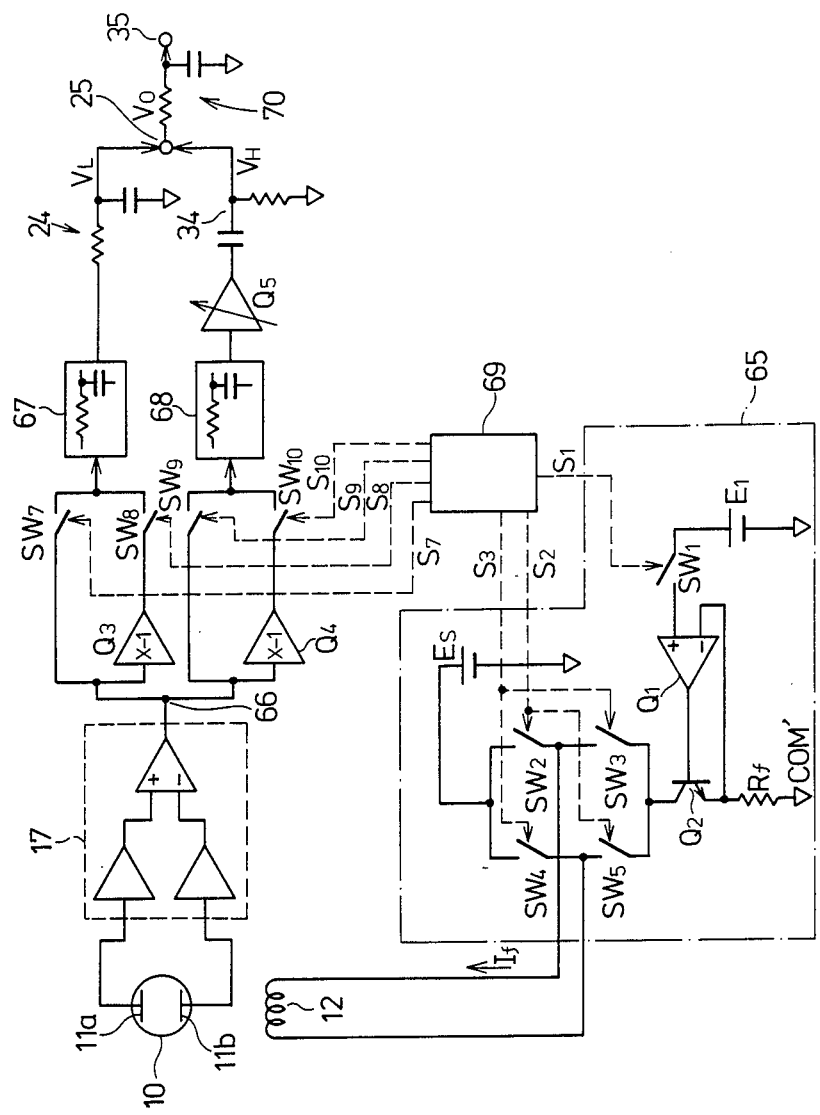
FIG. 8 is a block diagram depicting an eighth illustrative embodiment of the invention for excitation using square waves.

FIG. 8 depicts an embodiment wherein an excitation circuit applies square wave excitation current to an excitation coil. In the arrangement, excitation coil 12 is supplied with an exciting current $I_f$ from an excitation circuit 65. A reference voltage $E_1$ is applied via a switch $SW_1$ to a non-inverting input terminal (+) of an amplifier $Q_1$, which has its output terminal connected to the base of a transistor $Q_2$. The emitter of transistor $Q_2$ is connected via a resistor $R_f$ to common COM and to the inverting input terminal (−) of amplifier $Q_1$. An excitation voltage $E_S$ is applied between common COM and the collector of transistor $Q_2$ via both a series circuit of switches $SW_2$ and $SW_3$ and a series circuit of switches $SW_4$ and $SW_5$, which in turn is connected in parallel with the former series circuit as depicted. Exciting coil 12 is connected to the node between switches $SW_2$ and $SW_3$ and to the node between switches $SW_4$ and $SW_5$. The connections of these switches $SW_1$, $SW_2$ and $SW_5$, and $SW_3$ and $SW_4$ are controlled by timing signals $S_1$, $S_2$ and $S_3$, respectively.

On the other hand, the signal voltage is detected at electrodes 11a, 11b and is outputted to pre-amplifier 17. Pre-amplifier 17 eliminates the common mode voltage and performs impedance conversion and then outputs the signal voltage via its output terminal to a node 66. The signal voltage at the node 66 is applied via either a switch $SW_7$ or a series circuit of an inverting amplifier $Q_3$ and a switch $SW_8$ to a low pass filter 67 having a small time constant.

The signal voltage at node 66 is further applied via either a switch $SW_9$ or a series circuit of an inverting amplifier $Q_4$ and a switch $SW_{10}$ to a low pass filter 68 having a small constant. These switches $SW_7$, $SW_8$, $SW_9$ and $SW_{10}$ are turned ON or OFF, respectively, with timing signals $S_7$, $S_8$, $S_9$ and $S_{10}$, from a timer 69. The output of low pass filter 67 and the output of low pass filter 68 are supplied, respectively, via low pass filter 24 having a large time constant and a series circuit of a variable gain amplifier $Q_5$ and high pass filter 34 and are added at addition node 25 so that the added output is outputted via a low pass filter 70 to output terminal 35.

Variable gain amplifier $Q_5$ equalizes output voltage $V_L$ of low pass filter 24 and output voltage $V_H$ of high pass filter 34. The individual constants are selected so that the sum of the transfer functions of the low frequency loop composed of the circuit components from node 66 to addition node 25 passing through low pass filter 24 and the high frequency loop composed of the circuit components from node 66 to addition node 25 passing through high pass filter 34 becomes about 1. In practice, it is sufficient to equalize the time constants of low pass filter 24 and high pass filter 34 and to equalize the signal voltages of the individual loops by adjusting the gain of variable gain amplifier $Q_5$.

Next, the operation of FIG. 8 will be described with reference to FIG. 9, lines (a)-(j) and FIGS. 10(A)-10(D). The timing signal $S_1$ repeats its ON/OFF, as shown in FIG. 9, line (a), so that the reference voltage $E_1$ is applied to the non-inverting input terminal (+) of amplifier $Q_1$, or removed. On the other hand, switches $SW_2$ and $SW_5$ and switches $SW_3$ and $SW_4$ are alternately turned ON with the low frequency waves of the timing signals $S_2$ (FIG. 9, line (b)) and $S_3$ (FIG. 9, line (c)), respectively, so that there flows exciting current $I_f$, in which low frequency waves (having a period of 2T) and high frequency waves (having a period of 2t) are composed (FIG. 9, line (d)).

The signal voltage at node 66 is sampled with timing signals $S_7$ and $S_8$ (FIG. 9, line (e) and line (f)) so that the voltage shown in FIG. 9, line (g) is obtained at the output terminal of switch $SW_7$. This voltage is smoothed by low pass filter 67 and is outputted via low pass filter 24 to addition node 25.

Moreover, the signal voltage at node 66 is sampled at times shown in FIG. 9, line (h) and line (j) with the timing signals $S_9$ and $S_{10}$. As a result, a signal voltage (FIG. 9, line (j)) is outputted at the output terminal of switches $SW_9$ and has its level adjusted by variable gain amplifier $Q_5$ until it is outputted via high pass filter 34 to addition node 25.

The signal voltages added at addition node 25 are smoothed by low pass filter 70 and outputted to output terminal 35. If, in this case, the transfer function of low pass filter 24 is expressed by $1/(1+T_1S)$ and the transmission function of high pass filter 34 is expressed by $T_2/(1+T_2S)$, the respective time constants $T_1$ and $T_2$ are selected to satisfy $T_1=T_2$ so that those transmission functions have the sum of 1.

Figure 10B:
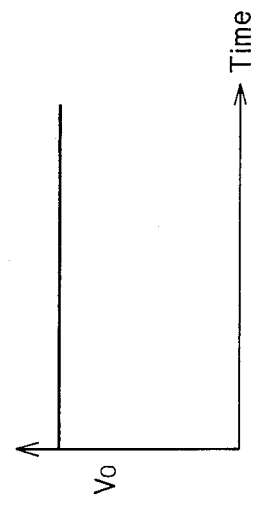
FIGS. 10(A), 10(B), 10(C), 10(D) are waveform charts for explaining indicial responses of FIG. 8.
Figure 10D:
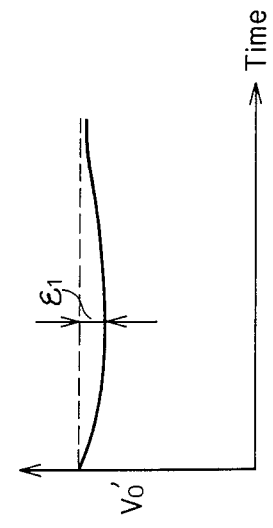
Figure 10A:
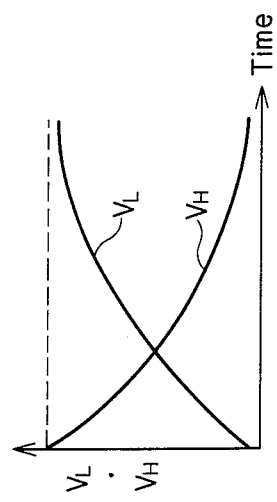

If the individual time constants are selected to satisfy the above relation, signal voltage $V_L$ of the output of low pass filter 24 and signal voltage $V_H$ of high pass filter 34 vary (FIG. 10(A)) in case the signal voltages vary stepwisely. As a result, added output $V_O$ exhibits stepwise variations without any error (FIG. 10(B))

Figure 10C:
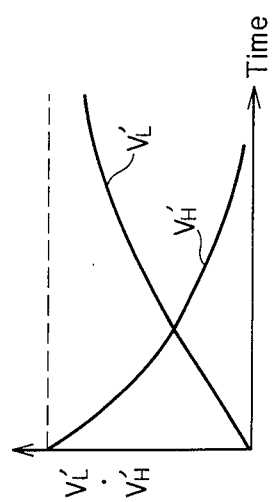

In case the sum of the individual transmission functions is not at 1, on the other hand, a signal voltage $V_L$ of the output of low pass filter 24 and signal voltage $V_H$ of the output of high pass filter 34 vary (FIG. 10(C)) in case the signal voltages vary stepwisely. As a result, the added output $V_O'$ exhibits variations including error $\epsilon_1$ (FIG. 10(D)).

Low pass filter 24 and high pass filter 34 are not limited to first order filters, but may be filters of any type if the sum of their transmission functions is 1. In case no accuracy is required for the step response, on the other hand, the sum of the transmission functions need not be accurately adjusted.

Figure 11:
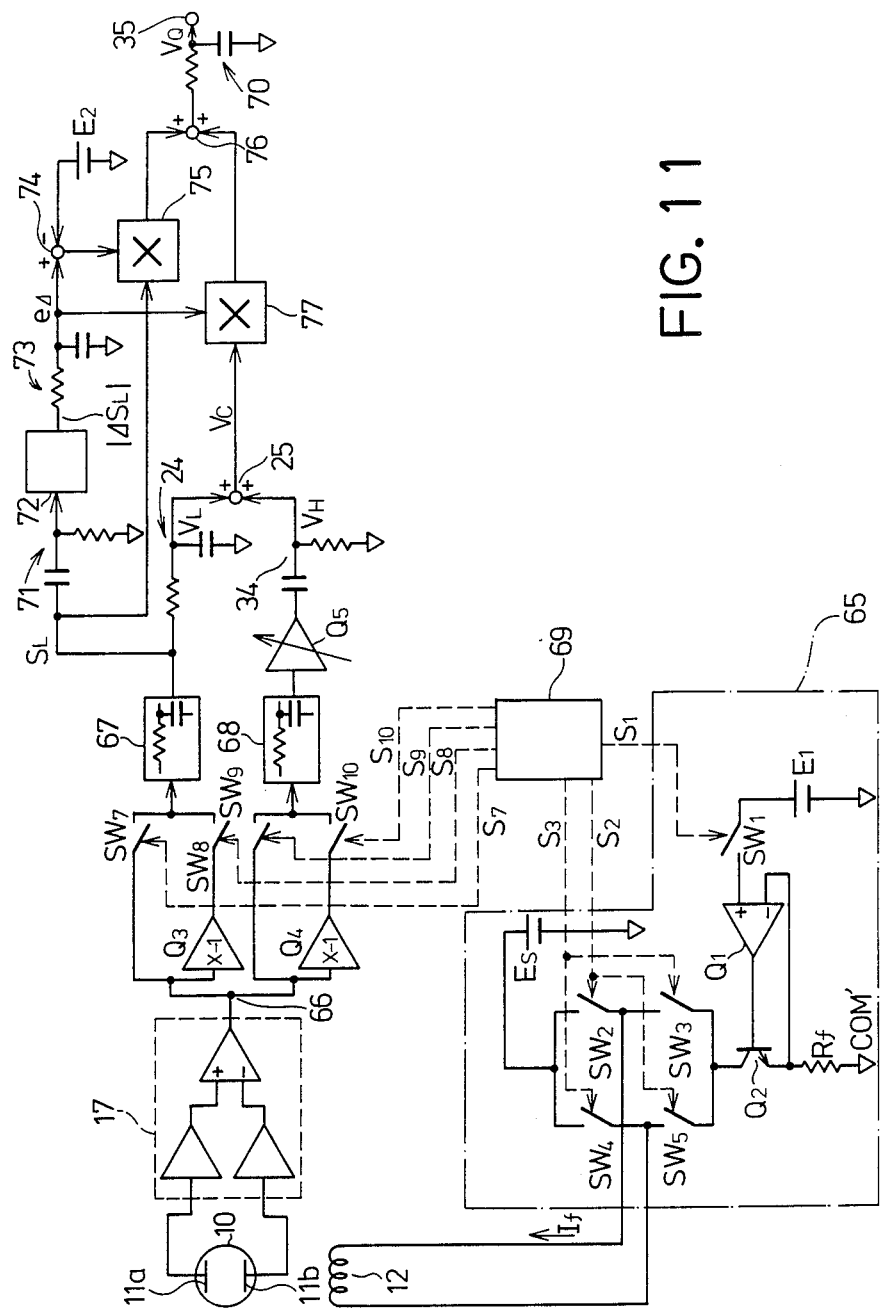
FIG. 11 is a block diagram of a ninth illustrative embodiment wherein the changing rate of noises is detected and used to add the outputs of two frequency excitation and low frequency excitation at an arbitrary ratio.

FIG. 11 makes use of the respective advantages of two frequency excitation and low frequency excitation.

Generally, flow noises and derivative noises readily invade electromagnetic flow meters. The differential noises are due to the capacity coupling between the exciter and the electrodes so that slow (or middle) drifts follow in case of high frequency excitation.

On the other hand, low frequency excitation is advantageous in that it has a stable zero point and is not substantially susceptible to the differential noises. However, disadvantageously, it responds to flow noises because the frequency band thereof is in the frequency band of the flow noises.

As shown in FIG. 8, the case of the two frequency excitation having the two low and high frequencies, is advantageous in that it has a stable zero point and is stable to the flow noises, as will be understood from the foregoing description. However, disadvantageously, although it is stable for a long period of time against differential noises, it is susceptible to middle term drifts because of its high frequency signal processing unit.

In case neither flow noises nor differential noises exist or in case only differential noises exist, therefore, an output having a stable zero point can be attained even if the signals are processed by the low frequency signal processing unit. In case the flow noises exist, on the other hand, the output having the stable zero point can be attained if the signals are processed at the two frequency exciting side. Moreover, while the fluid is flowing both the flow and differential noises exist. As a result, even if the zero point at the two frequency exciting side is caused to fluctuate (with the middle fluctuations) around the zero point for an appropriate time period by the differential noises, these fluctuations of the zero point are masked and averaged with time so that they raise no substantial error.

In the embodiment of FIG. 11, optimum output is generated by detecting the magnitude of flow noises with the output at the low frequency side and by accordingly varying the adding ratio between the low frequency side signal and the two frequency side.

A signal $S_L$ containing flow noises is detected from the output of low pass filter 67 at the low frequency side, and its varying component $\Delta S_L$ is extracted by a high pass filter 71 and outputted to an absolute value circuit 72. Absolute value circuit 72 takes absolute value $|\Delta S_L|$ of varying component $\Delta S_L$ and applies it as an output $e\Delta$ via a low pass filter 73 to one terminal of a subtraction node 74. The other terminal of this subtractor 74 is supplied with reference voltage $E_2$ so that the resultant voltage difference is applied to a multiplier 75. Since the output $e\Delta$ is selected here to satisfy $0 \leq e\Delta \leq E_2$, the voltage to be applied to multiplier 75 becomes lower as the varying component $\Delta S_L$ of the signal $S_L$ becomes larger. Multiplier 75 take the product of signal $S_L$ and the output of subtractor 74 and outputs it to one terminal of a ratio adder 76.

On the other hand, multiplier 77 takes the product of the composed output $V_C$ of addition node 25 and the output $e\Delta$ of low pass filter and applies it to the other terminal of adder 76. This relation is expressed as $V_O=kV_C+(1-k)S_L$, wherein k designates the ratio to be controlled by the output $e\Delta$.

An addition node 76 adds the respective outputs from multipliers 75 and 77 to output a flow rate output $V_O$ via low pass filter 70 to output terminal 35. As a result, as the varying component $\Delta S_L$ of the signal $S_L$ becomes larger, the output of low pass filter 73 becomes larger so that the output of multiplier 75 becomes smaller and the output of multiplier 77 becomes larger. This reduces the ratio of the output of low frequency to the output to the two frequency side.

Thus, according to the invention, the optimum output can be attained by detecting the fluctuations of the slurry noises or the like at the low frequency side signal to automatically change the ratio between the outputs of the two frequency side and the low frequency side in complementary relation.

Figure 12:
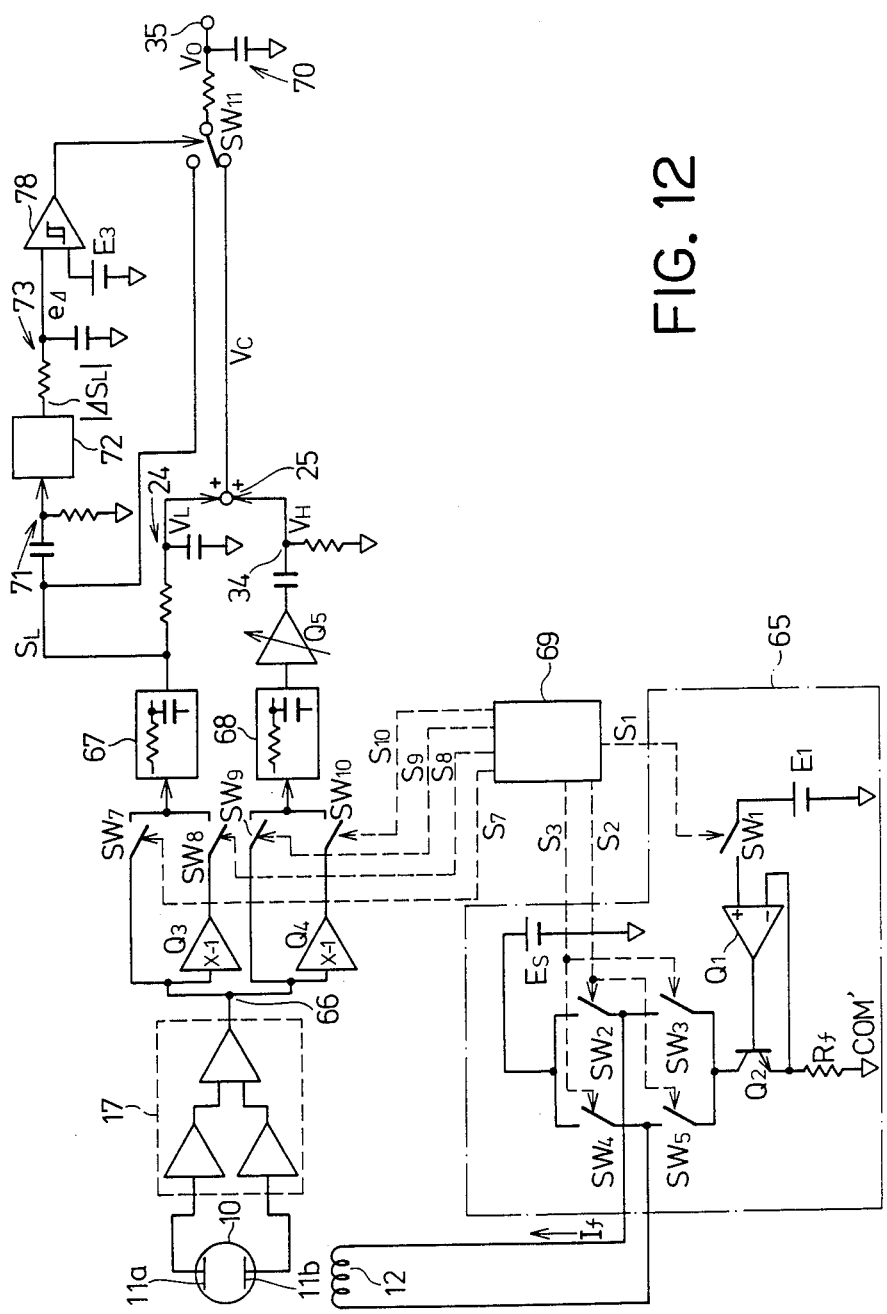
FIG. 12 is a block diagram depicting a tenth illustrative embodiment which is a special construction of FIG. 11.

FIG. 12 is a simplification of FIG. 11. In this arrangement, the output eΔ of low pass filter 73 is applied to one input terminal of comparator 78 which has its other input terminal supplied with a reference voltage $E_3$ so that a switch $SW_{11}$ supplied with signal $S_L$, e.g. a low frequency signal, and composed output $V_C$, e.g. signal from the two frequency side, is selected by the output of comparator 78. When the output eΔ of a low pass filter 73 exceeds reference voltage $E_3$, switch $SW_{11}$ is switched to the composed output $V_C$. Otherwise, switch $SW_{11}$ is switched to low frequency signal $S_L$.

Figure 13:
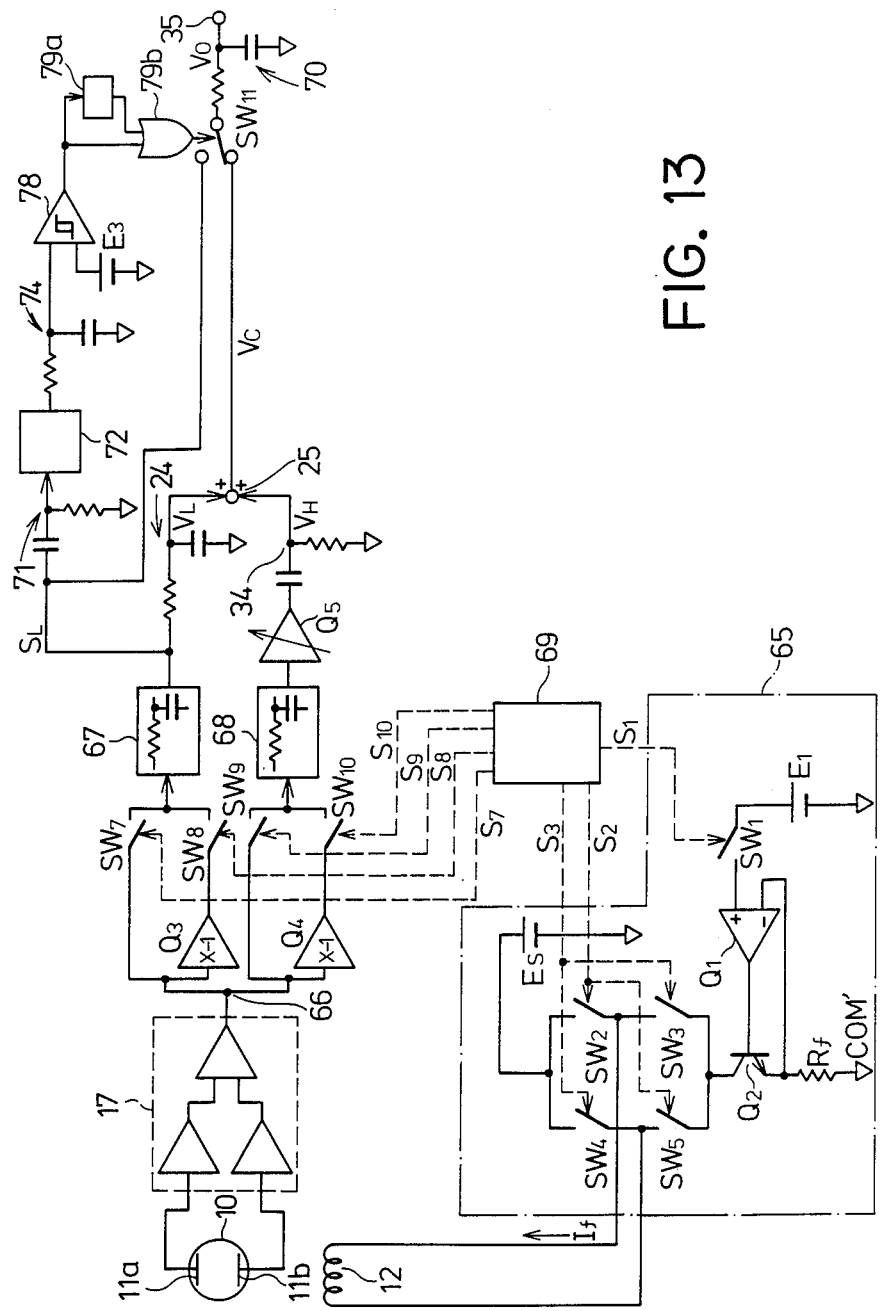
FIG. 13 is a block diagram depicting an eleventh illustrative embodiment wherein a change over unit is improved over FIG. 12.

FIG. 13 adds a hysteresis to FIG. 12 when a switch is switched. In the arrangement, the output of comparator 78 and the output through a monostable circuit 79a are applied to the input terminals of the OR circuit 79b which in turn controls switch $SW_{11}$ with its output. When switch $SW_{11}$ is in an unswitched state for the time period of a predetermined width of the pulse generated by monostable circuit 79a even if the output of comparator 78 varies so that chattering is prevented from occurring.

Figure 14:
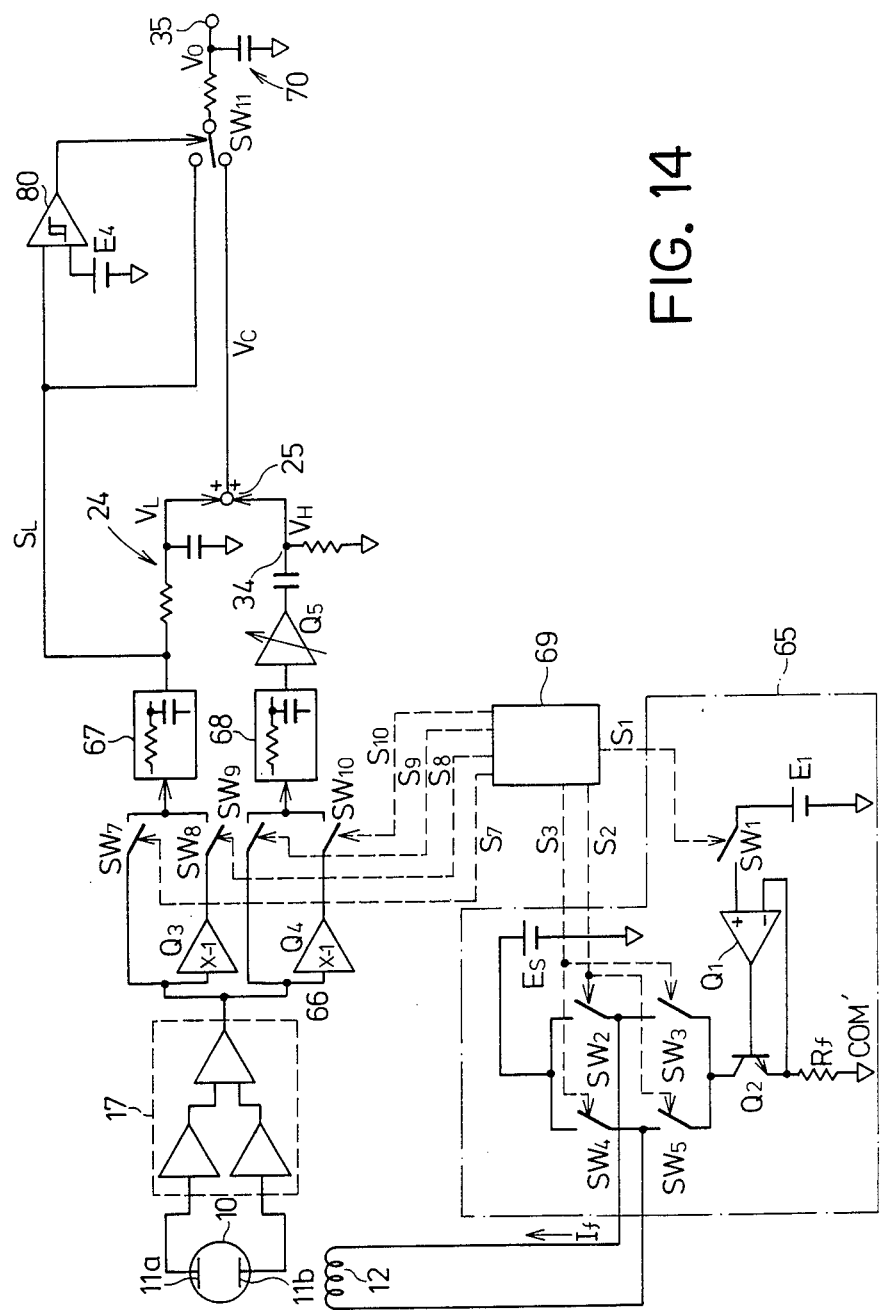
FIG. 14 is a block diagram depicting a twelveth illustrative embodiment wherein the magnitude of noises is detected and used to interchange the outputs of two frequency and low frequency excitations.

FIG. 14 depicts a circuit wherein the two frequency side and the low frequency side are switched by detecting the level of the output at the low frequency side.

In the embodiments of FIGS. 11, 12, 13, variations of the signal at the low frequency side are detected drive switch $SW_{11}$. In FIG. 14 the magnitude itself of the signal at the low frequency side is detected. A comparator 80, having one input supplied with reference voltage $E_4$ and another input terminal supplied with signal $S_L$, switches switch $SW_{11}$ to the low frequency or two frequency side with its output. When signal $S_L$ is higher than reference voltage $E_4$, switch $SW_{11}$ is switched to the two frequency side to generate composed output $V_C$.

Figure 15:
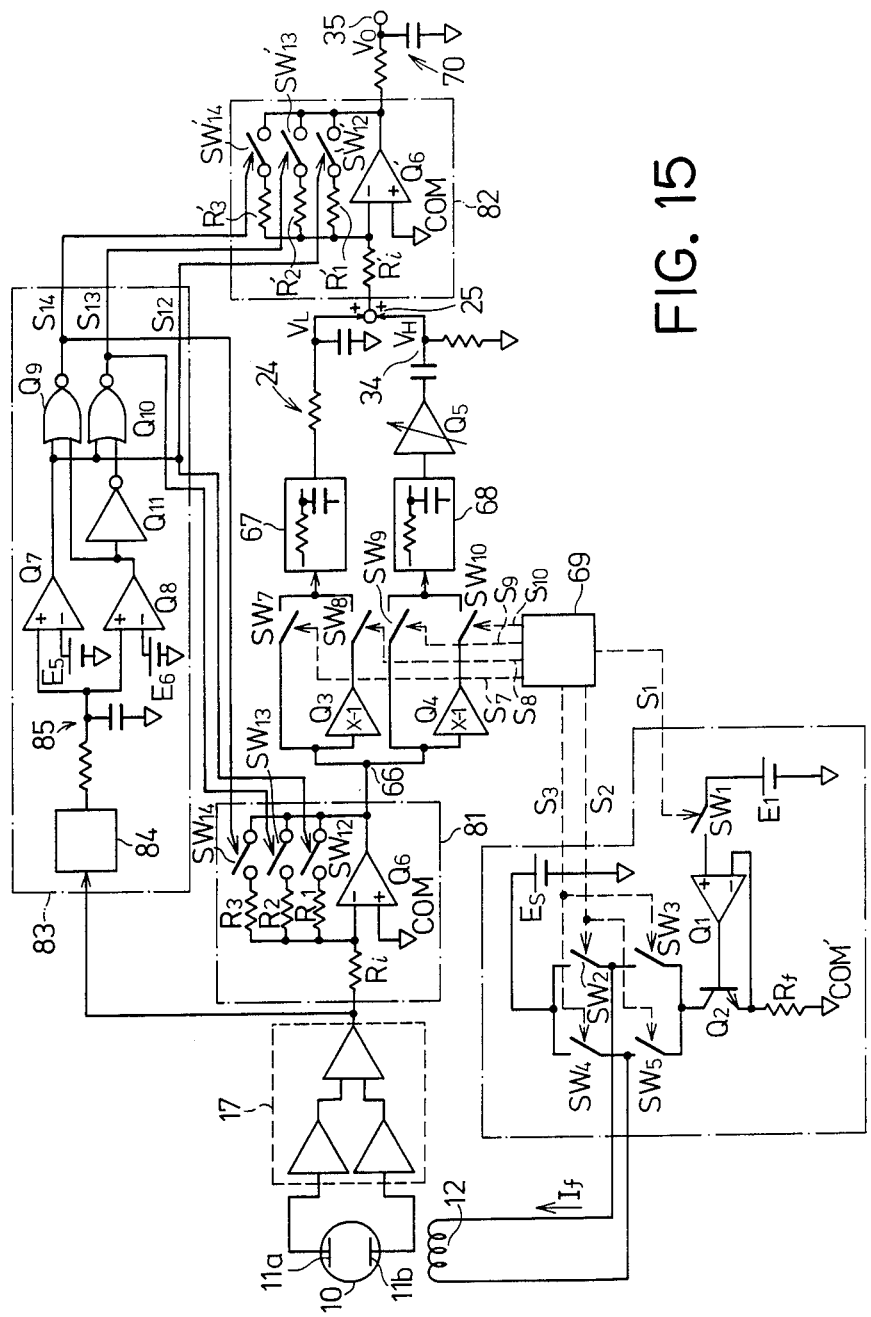
FIG. 15 is a block diagram depicting a thirteenth illustrative embodiment wherein the distribution of amplification degree of a circuit is changed to prevent saturation of an amplifier, or the like, due to noises.

FIG. 15 depicts an arrangement wherein the distribution of the amplification degree of the circuit is changed to prevent any saturation of the amplifier due to noises.

The electromagnetic flow meter has a tendency to reduce the exciting power so as to effect power economy but has its signal voltage lowered for the lower exciting power. In order to compensate for this, there is a tendency to enlarge the amplification degree of the circuit. Since, on the other hand, slurry noises or the like are independent of the exciting power, the electromagnetic flow meter has a tendency to become weak to noises such as slurry noises. In FIG. 15, the distribution of the amplification degree in the circuit is changed according to the noises to prevent saturation of the circuit.

A variable amplifier 81 is connected between the output terminal of preamplifier 17 and node 66, and a compensating amplifier 82 is connected between addition node 25 and low pass filter 70 of the output. Moreover, the amplification degree of variable amplifier 81 and compensating amplifier 82 are so controlled with the noises detected by a noise detector 83 that the corresponding product of the amplification degree of variable amplifier 81 and compensating amplifier 82 are constant.

Variable amplifier 81 comprises an amplifier $Q_6$ having its non-inverting input terminal (+) connected to common potential point COM and inverting input terminal (−) connected to the other terminal of preamplifier 17 via a resistor $R_i$. Between inverting input terminal (−) and the output terminal of amplifier $Q_6$, there are connected in parallel a series circuit comprising resistor $R_1$ and switch $SW_{12}$, a series circuit comprising resistor $R_2$ and switch $SW_{13}$, and a series circuit comprising $R_3$ and switch $SW_{14}$. Switches $SW_{12}$, $SW_{13}$, $SW_{14}$ are switched with control signals $S_{12}$, $S_{13}$, $S_{14}$, respectively, from noise detector 83.

Noise detector 83 comprises absolute value circuit 84 which is connected to the output of pre-amplifier 17. The output of preamplifier 17 has its absolute value calculated by absolute value circuit 84 and is outputted to a low pass filter 85. The output of low pass filter 85 is applied to both the non-inverted terminal (+) of comparator $Q_7$, which has its inverter input terminal (−) supplied with a reference voltage $E_5$; and the non-inverted input terminal (+) of comparator $Q_8$, which has its inverted input terminal (−) supplied with reference voltage $E_6$, so that its level is compared. The outputs of comparators $Q_7$ and $Q_8$ are applied to the respective input terminals of a NOR gate $Q_9$ so that their NOR is calculated to generate control signals $S_{14}$ at its output terminal. The outputs inverted from the outputs of comparators $Q_7$ and $Q_8$ by an inverter $Q_{11}$ are applied to the respective input terminals of a NOR gate $Q_{10}$ so that their NOR gate is calculated at the NOR gate $Q_{10}$ to generate control signal $S_{13}$ at its output terminal. Moreover, control signal $S_{12}$ is obtained as the output of comparator $Q_7$. These control signals detect the magnitude of the noises generated at the output terminal of pre-amplifier 17 so that they switch the respective switches in accordance with the noise magnitude to change the amplification degree of amplifier 81.

Compensating amplifier 82 is constructed similarly to variable amplifier 81. The output terminal of circuit 24 is connected via a resistor $R_i'$ to inverting input terminal (−) of amplifier $Q_6'$ which has its non-inverting input terminal (+) connected to common potential point COM. Between the output terminal and the inverted input terminal (−) fo amplifier $Q_6'$, there are connected in parallel a series circuit comprising resistor $R_1'$ and switch $SW_{12}'$; a series circuit comprising resistor $R_2'$ and switch $SW_{13}'$; and a series circuit comprising resistor $R_3'$ and switch $SW_{14}'$. Switches $SW_{12}'$, $SW_{13}'$, $SW_{14}'$ are switched with control signals $S_{12}$, $S_{13}$, $S_{14}$, respectively, from noise detector 83. The respective constants of the elements are so selected that the compensating amplifier 82 are variable to compensate for the amplification degree of the variable amplifier 82 and to maintain the overall amplification degree constant. Thus, the amplification degrees are changed according to the magnitude of the noises to prevent the saturation of the circuit due to the noises.

Figure 16:
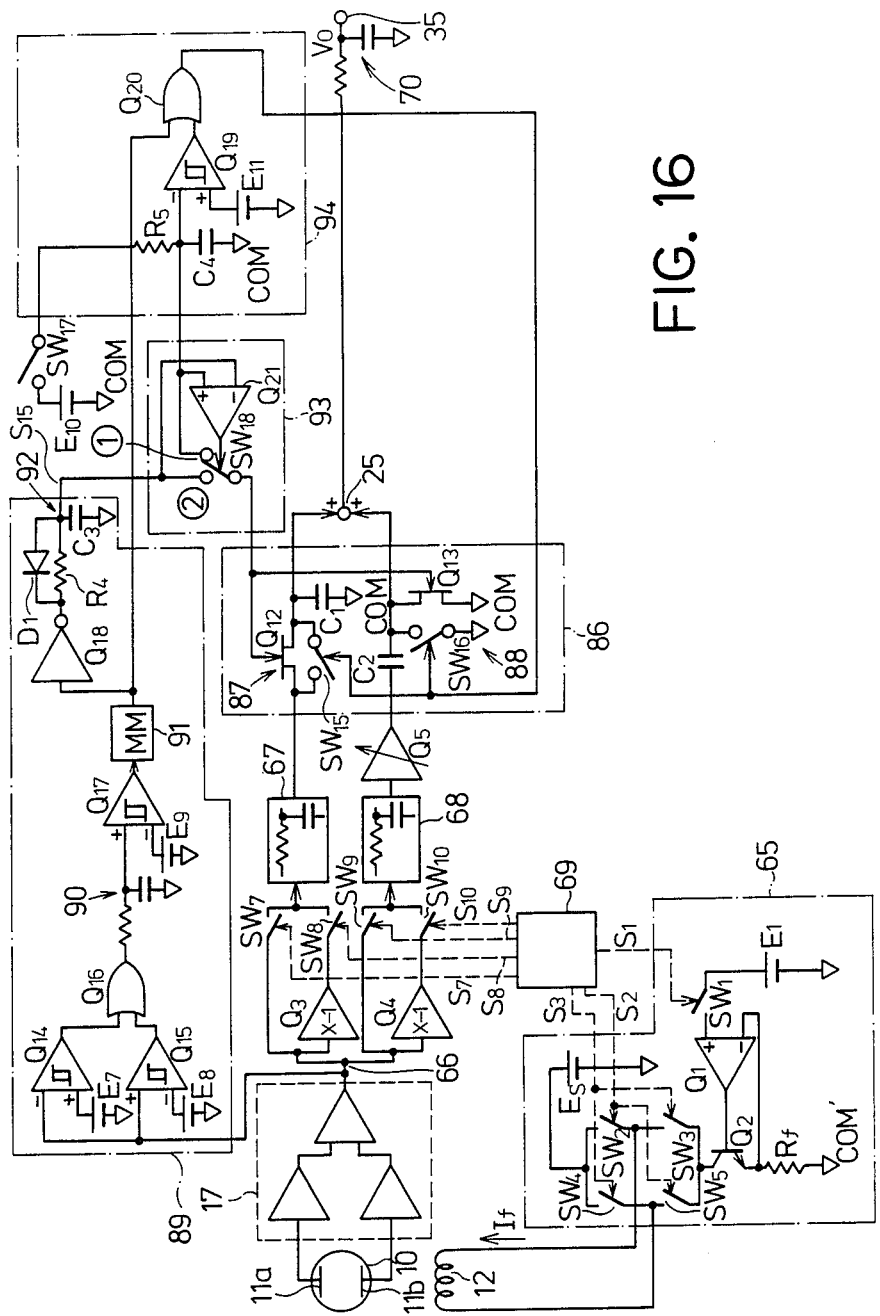
FIG. 16 is a block diagram depicting a fourteenth illustrative embodiment which features a rapid return to normal operation.

FIG. 16 is an arrangement wherein the circuit is returned quickly to normal operation. Since two frequency excitation requires at its low frequency side a low pass filter having a large time constant, it takes a considerable time period for the return to steady state operation when the power supply is switched or when the noises enter and are eliminated, that is to return from an abnormal state to the normal state. This problem is solved by the FIG. 16 embodiment.

A time constant changer 86 is as follows. Between the output terminal of low pass filter 67 having a small time constant and addition node 25, there is connected in series a transistor $Q_{12}$ which has its two terminals shorted by switch $SW_{15}$. A capacitor $C_1$ is connected between the output terminal of transistor $Q_{12}$ and common potential point COM. Transistor $Q_{12}$, having its internal resistance controlled with a control signal $S_{15}$ and capacitor $C_1$ make the time constant of low pass filter 87 variable.

A capacitor $C_2$ is connected in series between the output terminal of varable gain amplifier $Q_5$ and addition node 25. Between the output terminal of capacitor $C_2$ and common potential point COM, there is connected a transistor $Q_{13}$ which is shorted by a switch $SW_{16}$ and has its internal resistance controlled with control signal $S_{15}$. Transistor $Q_{13}$ and capacitor $C_2$ considered together constitute a high pass filter 88.

Noise detector 89 comprises comparators $Q_{14}, Q_{15}$. The output of pre-amplifier 17 is applied to the minus input terminal of comparator $Q_{14}$, which has its plus input terminal supplied with a reference voltage $E_7$, and to the plus input terminal of comparator $Q_{15}$ which has its minus input terminal supplied with a reference voltage $E_8$. The respective outputs of comparators $Q_{14}, Q_{15}$ are applied to the respective inputs of an OR gate $Q_{16}$. The output of OR gate $Q_{16}$ is applied via a low pass filter 90 to the plus input terminal of comparator $Q_{17}$ which has its minus input terminal supplied with reference voltage $E_9$ and its output terminal connected to a monostable circuit 91. The output of monostable circuit 91 is inverted by an inverter $Q_{18}$ and outputted to a low pass filter 92. Low pass filter 92 is constructed of a resistor $R_4$ and a capacitor $C_3$, and resistor $R_4$ has its two terminals shorted by a diode $D_1$ to generate control signal $S_{15}$ at the output terminal of low pass filter 92.

When the output of pre-amplifier 17 contains low level noise, the output of OR gate $Q_{16}$ is in the low level state, the output of comparator $Q_{17}$ is also at the low level. As a result, the output of the monostable circuit 91 is at the low level, but the output of the low pass filter 92, i.e. the control signal $S_{15}$, is at the high level. This state is applied via a selector 93 to transistors $Q_{12}$ and $Q_{13}$ to maintain their internal resistances at high states.

Next, if noises exceeding reference voltages $E_7$ and $E_8$ appear at the output of pre-amplifier 17, the output of low pass filter 90 takes the high level. As a result, the output of comparator $Q_{17}$ holds its high level as long as the noises exist.

Since, however, the output of comparator $Q_{17}$ falls to the low level when the noises disappear, the monostable circuit 91 detects the down edge to generate a pulse of a high level and a predetermined length at its output. This pulse is inverted by inverter $Q_{18}$ and applied to low pass filter 92, the output of control signal $S_{15}$ drops once to the low level and then restores the high level at a rate determined by the time constant of low pass filter 92.

As a result, when the noises disappear, the internal resistances of transistor $Q_{12}$ and $Q_{13}$ drop once and then gradually rise so that the return to the steady state after disappearance of the noises is accelerated.

Power source state detector 94 comprises comparator 19 and OR gate $Q_{20}$. A power source $E_{10}$ is applied via a switch $SW_{17}$ to resistor $R_5$ and capacitor $C_4$. The voltage at the node between resistor $R_5$ and capacitor $C_4$ is applied to the minus input terminal of a comparator $Q_{19}$ which has its plus input terminal supplied with a reference voltage $E_{11}$. OR gate $Q_{20}$ has its input terminals supplied with respective outputs from monostable circuit 91 and comparator $Q_{19}$ to turn ON or OFF switches $SW_{15}$ and $SW_{16}$ of the time constant changer 86 with its OR output.

Since the voltage at the node between resistor $R_5$ and capacitor $C_4$ is at the low level when the power source voltage is switched, the output of comparator $Q_{19}$ is at the high level, and the switches $SW_{15}$ and $SW_{16}$ are in their ON states. After lapse of a predetermined time period, determined by the time constant of resistor $R_5$ and capacitor $C_4$, however, the output of comparator $Q_{19}$ is inverted to the low level so that the switches $SW_{15}$, $SW_{16}$ are turned OFF.

As a result, for predetermined time period from the instant of switching the power supply, the time constant of the time constant changer 86 is so small that the normal operations are quickly established.

Upon restoration of normal operation after disappearance of noises, moreover, the pulse at the high level is applied for a predetermined time period from monostable circuit 91 via OR gate $Q_{20}$ to turn ON switches $SW_{15}$, $SW_{16}$.

In selector 93, control signal $S_{15}$ and the voltage at the node between resistor $R_5$ and capacitor $C_4$ are applied to the respective input terminals of a comparator $Q_{21}$ to control a switch $SW_{18}$ with its output. Switch $SW_{18}$ is at the side (1) when the power supply is switched, but is switched to side (2) when in the steady state.

Figure 17:
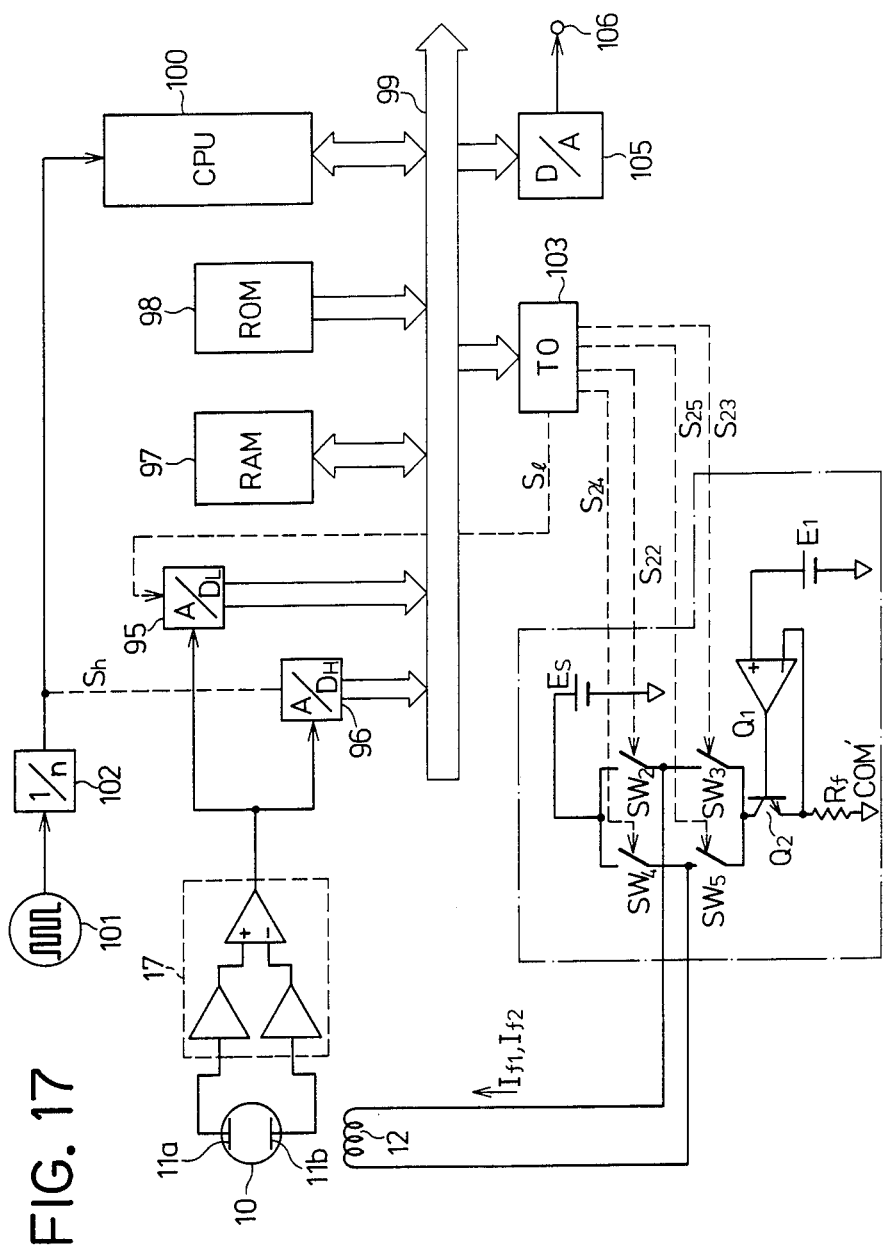
FIG. 17 is a block diagram depicting a fifteenth illustrative embodiment using a microcomputer.

FIG. 17 depicts an embodiment comprising a microcomputer. The output of pre-amplifier 17 is converted by an analog/digital converter (A/$D_L$) 95 and an analog/digital converter (A/$D_H$) into digital signals, which are stored via a bus 99 in a random access memory (RAM) 97. A read only memory (ROM) 98 stores a predetermined program and initial data. Under the control of a processor (CPU) 100, the operations are executed in accordance with the operation procedures stored in ROM 98, and the result is stored in RAM 97.

A clock generator 101 is provided which generates a clock having a frequency divided into one n-th fraction by a frequency divider 102 and which is fed as a system clock $S_h$ to CPU 100 and analog/digital converter 96.

In accordance with the operations program stored in ROM 98, CPU 100 outputs a timing signal for determining the waveform of an exciting current $I_{f1}$ (or $I_{f2}$) via bus 99 to a timing signal output port (TO) 103. In accordance with this timing, timing signal output port 103 outputs timing signals $S_{22}$, $S_{23}$, $S_{24}$ and $S_{25}$ for switching the exciting current. In response to these timing signals, $SW_2$, $SW_3$, $SW_4$ and $SW_5$ of exciting circuit 104, are switched.

In accordance with the timing designated by the CPU, moreover, the timing signal output port 103 outputs a timing signal Sl to analog/digital converter 95 to sample the output of pre-amplifier 17.

In accordance with the operations program stored in ROM 98, on the other hand, CPU 100 executes a predetermined operation by use of data stored in RAM 97, and the result of this operation is stored in RAm 97 and outputted as a flow rate output via bus 99 and through converter 105 to an output terminal 106.

Figure 21:
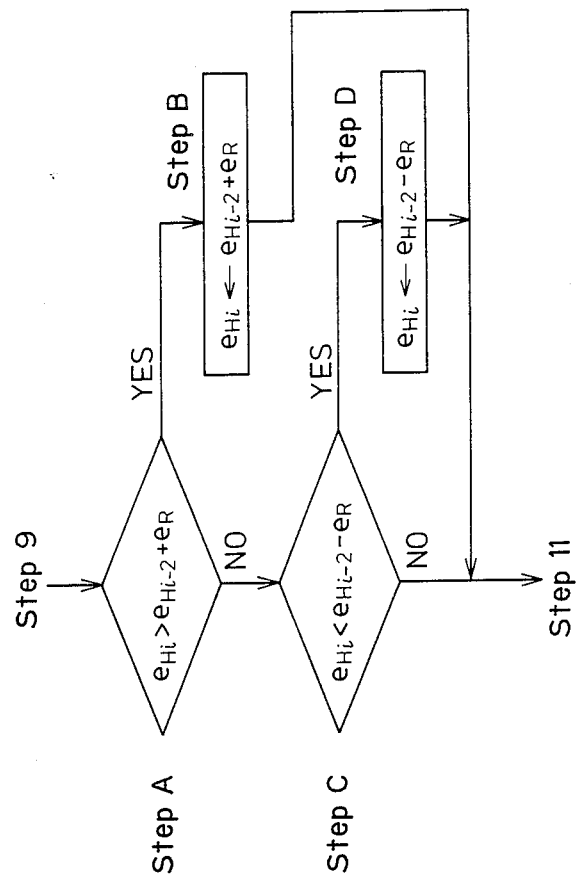
FIG. 21 is a flow chart showing the rate limit processing procedure of FIG. 19.

The operation of FIG. 17 will be described with reference to FIG. 18, comprising lines (a)–(n), FIG. 19, FIG. 20, and FIG. 21. The system clock $S_h$ obtained as the output of frequency divider 102 shown in FIG. 17 has the waveform shown in FIG. 18, line (a) and is fed to CPU 100.

Figure 18:
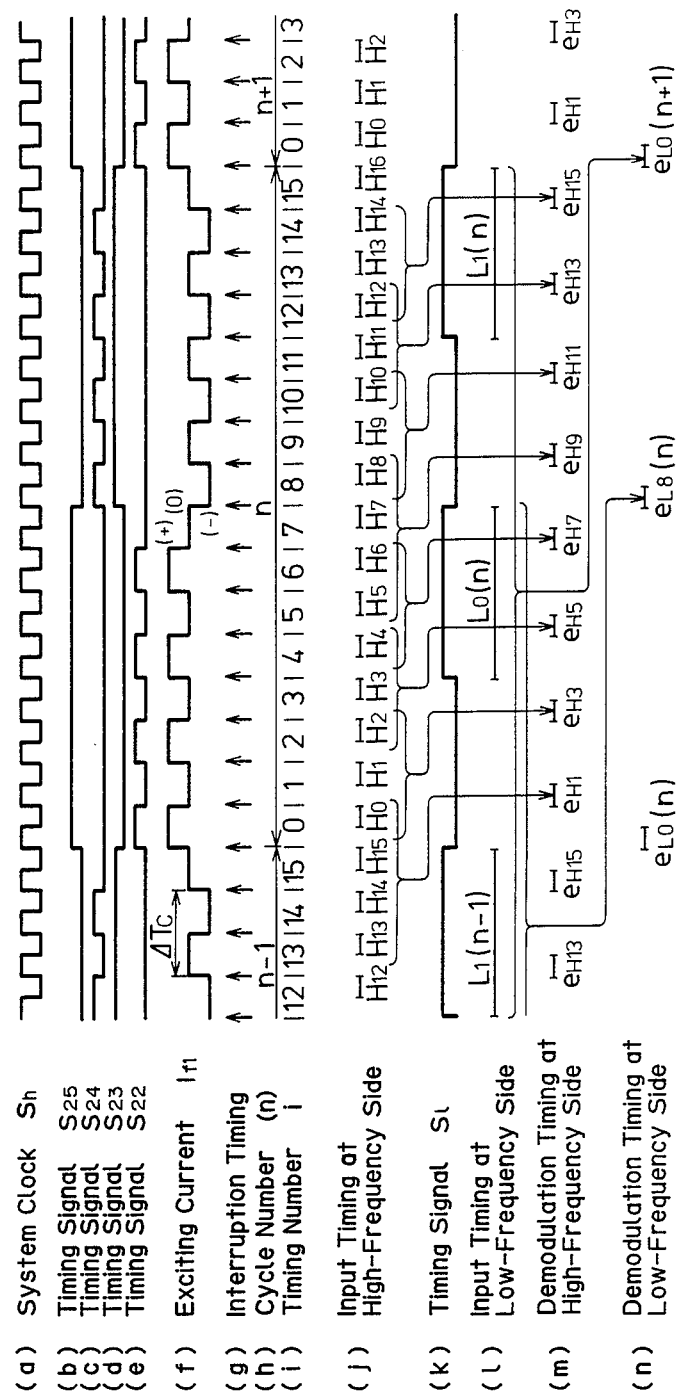
FIG. 18, comprising lines (a)-(n), is a timing chart for explaining operation of the embodiment of FIG. 17.
Figure 19:
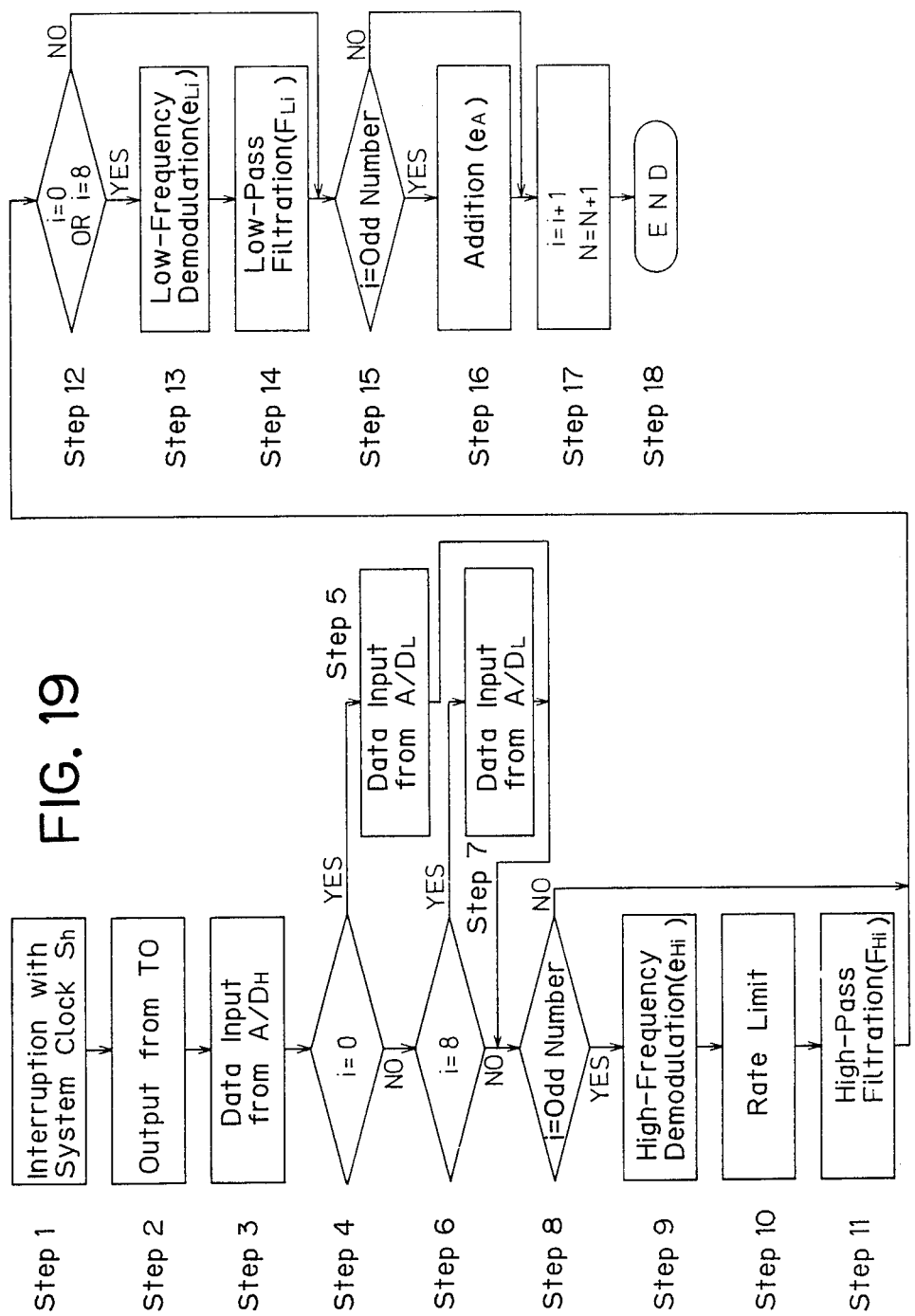
FIG. 19 is a flow chart showing processing procedures of the signals shown in FIG. 18.

At step 1 of FIG. 19 CPU 100 is synchronized with interruption timing (FIG. 18, line (g)) of the system clock $S_h$ to output a timing output indicating the switching timing of an exciting waveform via bus 99 to timing signal output port 103 in accordance with the predetermined operations program stored in ROM 98.

At Step 2, timing signal output port 103 receives the switching timing for the excitation wave to output the timing signals $S_{25}$ (FIG. 18, line (b)); $S_{24}$ (FIG. 18, line (c)); $S_{23}$ (FIG. 18, line (d)); and $S_{22}$ (FIG. 18, line (e)) to switches $SW_5$, $SW_4$, $Sw_3$ and $SW_2$ of exciter 104, respectively. In response to these timing signals, exciter 104 outputs exciting current $I_{f1}$ having the waveform shown in FIG. 18, line (f) to exciting coil 12. This waveform has a timing number i=0 to 15, which constitutes one cycle for repetition, as shown in FIG. 18, line (i), and has its n-cycle portion located at its center, as shown in FIG. 18, line (h). The exciting waveform has a multiple form of a low and high frequency waveform.

The operation then proceeds to Step 3. Steps 3 to 6 correspond to procedures for inputting data from converters 96 and 95. At Step 3, data inputted at each cycle from converter 96 in syncronism with system clock $S_h$ (FIG. 18, line (a)) are stored via bus 99 in a predetermined data area $H_i$ of RAM 97 under the control of CPU 100, as shown in FIG. 18, line (j).

Next, the operation proceeds to Step 4, at which it is judged whether or not the inputted timing number i is at 0. Then, the operation is transferred to Step 6, if NO, and to Step 5, if YES.

At Step 5, at the sampling timing by the timing signal Sl (FIG. 18, line (k)) outputted from the timing signal port 103, data inputted from converter 95 is store, as shown in FIG. 18, line (l), under the control of CPU 100 via bus 99, in the predetermined data areas—, $L_0(n-1)$, $L_0(n)$, $L_0(n+1)$ . . . , etc of RAM 97, until the operation proceeds to Step 8.

Next, at Step 7, at the sampling timing by timing signal S (FIG. 18, line (k)) outputted from timing signal port 103, data inputted from converter 95 are stored, as shown in FIG. 18, line (1), under control of CPU 100 via bus 99 in the predetermined data areas . . . , $L_1(n-1)$, $L_1(n)$, $L_1(n+1)$, . . . , etc, of RAM 97 until operation proceeds to Step 8.

At Step 8, it is judged whether or not the timing number i is odd. If the answer is YES, the operation proceeds to Step 9, and if the answer is NO, the operations proceeds to Step 12.

At Step 9, the high frequency waves are demodulated. For this demodulation, data $H_i$ stored in RAm 97 are used to perform an operation with the arithmetic equation shown in the column of a high frequency demoduation $e_{Hi}$ through the calculation details are not described hereat, which is stored in ROM 98 and shown in FIG. 20, at the timing shown in FIG. 18, line (m) and under control of CPU 100, and the arithmetic result is stored in RAM 97. By this demodulation, the electrochemical noises generated at electrodes 11a,11b are eliminated, and the differential noises are held at a constant level, thus causing no errors. A constant A appearing in FIG. 20 is expressed by the following equation, if letters TC designate the time constants of the high pass and low pass filters and letters $\Delta T_C$ designates an operation period shown in FIG. 18, line (f)

$$A = T_C/(T_C + \Delta T_C)$$

At Step 10, a rate limitation 11 is conducted. This step is not absolutely essential and is set forth only for sake of convenience of description. This operation is conducted for limiting the large amplitude of noises, which may be mixed because the response at the high frequency side is excellent in the two frequency excitation, to a predetermined value.

This will be described with reference to FIG. 21, wherein the upper side limit of the noises is judged at Step A. Here it is judged whether or not the present arithmetic result $e_{Hi}$ is larger than the value which is an addition of a rate limiting width $e_R$ to the previous arithmetic result $e_{Hi-2}$ at the high frequency side. The operation is judged to be normal and is shifted to Step C, if NO, and to Step B, if YES.

At Step B, the addition of the rate limiting width $e_R$ to the previous arithmetic result $e_{Hi-2}$ is outputted as the present value and has its amplitude limited.

At Step C, the lower side limit of the noises is judged. Here it is judged whether or not present arithmetic result $e_{Hi}$ is larger than the value, which is a subtraction of rate limiting width $e_R$ from previous arithmetic result $e_{Hi-2}$ at the high frequency side. The operation is judged to be normal and is shifted to Step 11, if NO, and to Step D, if YES.

At Step D, the subtraction of the rate limiting width $e_R$ from the previous arithmetic result $e_{Hi-2}$ is outputted as the present value and has its amplitude limited.

Next, the operation is shifted to Step 11 where high frequency filtration $F_{Hi}$ at the high frequency side is executed. For this filtration, data $E_{Hi}$ stored in RAM 97 and the previous filtration result are used to operate with the arithmetic equation, which is stored in ROM 98 and shown in the column of high frequency filtration $F_{Hi}$ of FIG. 20, under control of CPU 100, and the arithmetic result is stored in RAM 97.

Next, the operation proceeds to Step 12, whereat judgement is made whether or not the timing number i is at 0 or 8. The operation proceeds to Step 13, if YES, and to Step 15, if NO.

At Step 13, a low frequency demodulation is conducted. For this demodulation, data stored in RAM 97, . . . , $L_0(n-1)$, $L_0(n)$, $L_0(n+1)$, etc, and . . . , $L_1(n-1)$, $L_1(n)$, $L_1(n+1)$, etc, are used to operate with the arithmetic equation, which is stored in ROM 98 and shown in the column of the low frequency demodulation $e_{Li}$ of FIG. 20, at the timing shown in FIG. 18, line (n) and under the control of CPU 100, and the arithmetic result is stored in RAM 97. In FIG. 20, constant B is expressed $B = \Delta T/(\Delta T + T)$.

At Step 14, low frequency filtration $F_{Li}$ at the low frequency side is executed. For this filtration, data $e_{L0}$ and $e_{LB}$ stored in RAM 97 and the previous filtration result are used to operate with the arithmetic equation, which is stored in ROM 98 and shown in the column of low pass filtration $F_{Li}$ of FIG. 20, under control of CPU 100 and the arithmetic result is stored in RAM 97.

At Step 15, it is judged whether or not the timing number i is odd. If YES, operation proceeds to Step 16. If NO, operation proceeds to Step 17.

At Step 16, addition is executed. The result $F_{Hi}$ of the high frequency filtration and the result $F_{Li}$ of the low frequency filtration, which are stored in RAM 97, are used to operate with the arithmetic equation, which is stored in ROM 98 and shown in the column of addition $e_A$ of FIG. 20, under control of CPU 100 and the arithmetic result is stored in RAM 97 and gives an output $e_o$, until the operation proceeds to Step 18.

At Step 18, a standby is made until the next interruption, and the flow from Step 1 to Step 18 is executed again when the next interruption timing comes.

The signal processing operations when the waveform of the exciting current is changed will now be described with reference to FIGS. 22, 23, 24. Since these operations are substantially the same as those of FIGS. 17, 18, 19, 20, 21, 22, they will be described only in connection with the differences therebetween.

In FIG. 22, lines $(a)-(n)$, the waveform of a timing signal $S_{22}'$ is different from that of FIG. 18. As a result, the waveform of the exciting current $I_{f2}$ is different from that of FIG. 18 and takes the added waveform of the low frequency and high frequency waveforms. This slightly changes the signal processing procedure.

Figure 23:
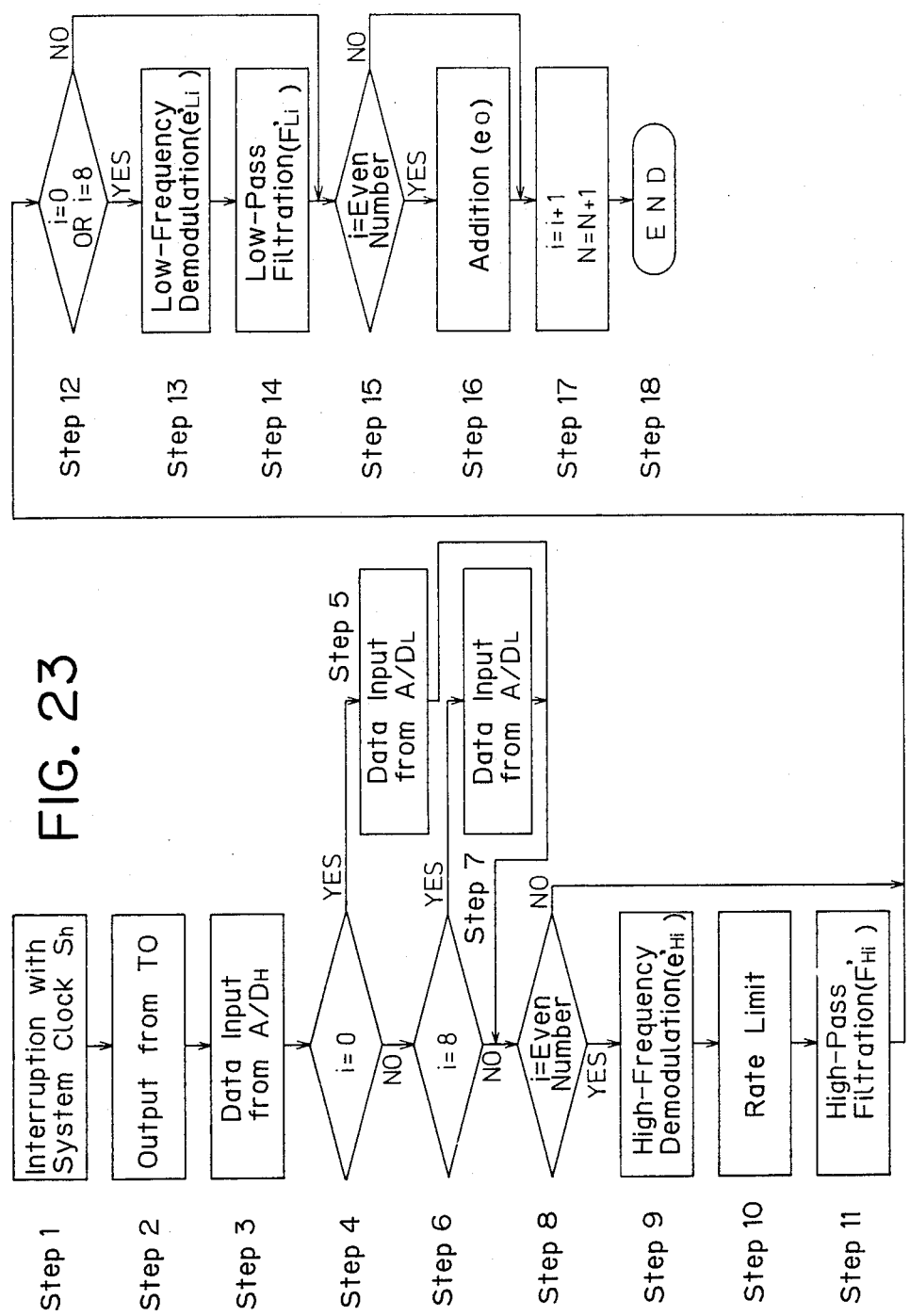
FIG. 23 is a flow chart showing the processing procedures of the signals shown in FIG. 22.

In the flow chart of FIG. 23, the differences from FIG. 19 exist only in the judgement at Step 8, the arithmetic operations at Steps 9, 11, 13, and 14 and the judgement at Step 15.

Judgements at Steps 8 and 15 are those which are required in connection with arithmetic operations at Steps 9, 11, 13, and 14.

The operation at Step 9 is conducted with the arithmetic equation, which is stored in ROM 98 and shown by a high frequency demodulation $e_{Hi}'$ in FIG. 24, with use of data stored in RAM 97, and at the timing shown in FIG. 22, line $(m)$, and the arithmetic result stored again via bus 99 in RAM 97.

The operation at Step 11 is conducted with the arithmetic equation, which is stored in ROM 98 and shown by a high pass filtration $F_{Hi}'$ in FIG. 24, and with use of data stored in RAM 97, and the arithmetic result is stored again via bus 99 in FIG. 97. The operation at Step 13 is conducted with the arithmetic equation, which is stored in ROM 98 and shown by a low frequency demodulation $e_{Li}'$ in FIG. 24, with the use of data stored in RAM 97, . . . , $L_0'(n-1)$, $L_0'(n)$, $L_0'(n+1)$, . . . , etc; and . . . , $L_1'(n-1)$, $L_1'(n)$, $L_1'(n+1)$, . . . , etc, and at the timing shown in FIG. 22, line (n), and the arithmetic result $e_{Li}'$ is stored again via bus 99 in RAM 97.

The operation at Step 14 is conducted with the arithmetic equation, which is stored in ROM 98 and shown by a low pass filtration $F_{Li}'$ in FIG. 24, and with the use of data stored in RAM 97, and the arithmetic result is stored again via bus 99 in RAM 97.

At Step 16, the results of the high pass filter $F_{Hi}'$ and the low pass filtration $F_{Li}$ are used and added to obtain an added output $e_0$.

In the description, no mention is made of the frequency of the exciting current. Since, however, the electromagnetic flow meter processes very low level signals, these signals are superposed on the noise from commercial power supply. As a result, by selecting the high frequency at a frequency not equal to a value integer times as high as the commercial frequency and by selecting the low frequency at one even number-th fraction of the commercial frequency, beats are caused between the commercial frequency or its evenly harmonic frequency and the excitation frequency and are eliminated by a low pass filter at a downstream stage.

As has been described in detail hereinbefore, by making a coupling with composing means for composing the output of the low frequency signal processing unit, including the low pass filter means and the output of the high frequency signal processing unit, including the high pass filter means with adding means, it is possible to provide an electromagnetic flow meter which has a quick response to the changes of flow rate and a stable zero point and is not substantially susceptible to influences due to flow and other noises.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An electromagnetic flow meter for metering the flow rate of a fluid by applying a magnetic field thereto, comprising
    exciting means for supplying a magnetic field having a first frequency and a second frequency, said second frequency being lower than said first frequency, to cause a signal voltage to be generated according to the flow rate;
    first demodulating means for discriminating and outputting said signal voltage on the basis of said first frequency;
    high pass filtering means for high pass filtering an output signal of said first demodulating means;
    second demodulating means for discriminating and demodulating said signal voltage on the basis of said second frequency;
    low pass filtering means for low pass filtering of an output signal of said second demodulating means; and
    composing means for algebraically composing respective output signals of said high pass filtering means and said low pass filtering means.

2. The flow meter of claim 1, wherein said composing means generates an output signal; and further comprising
    noise detecting means for detecting fluctuations of said signal voltage from said output signal from said second demodulating means and for producing an output signal in response thereto; and
    rate control means for controlling adding of the output signals from said composing means and said second demodulating means with the output signal from said noise detecting means.

3. The flow meter of claim 1, further comprising
    comparing means for comparing the absolute value of said output signal from said second demodulating means and a level set voltage; and
    switching means adapted to be switched to said second demodulating means when said signal voltage does not exceed a predetermined level, and to said composing means when said predetermined level is exceeded.

4. The flow meter of claim 3, further comprising
    hysteresis means disposed at an output terminal of said comparing means.

5. The flow meter of claim 1, further comprising
    comparing means for comparing the absolute value of the time variation of said output signal from said second demodulating means and a level set voltage; and
    switching means adapted to be switched to said second demodulating means when said signal voltage does not exceed a predetermined level, and to said composing means when said predetermined level is exceeded.

6. The flow meter of claim 1, wherein the sum of the transfer functions of said high pass filtering means and said low pass filtering means is selected to be about 1.

7. The flow meter of claim 1, wherein said first frequency is selected to be one which is not equal to an integral number multiplied by a commercial frequency and wherein said second frequency is selected to be one which is a fraction of said commercial frequency having an even numbered denominator.

8. The flow meter of claim 1, further comprising
gain adjusting means disposed at said high pass filtering means or at said low pass filtering means, for adjusting a gain so that the respective outputs of said high pass filtering means and said low pass filtering means are substantially equal.

9. The flow meter of claim 1, further comprising
variable amplifying means for variably amplifying said signal voltage and for supplying amplified signal voltage to said first and second demodulating means;
amplification compensating means disposed downstream of said composing means for compensating the variations of the amplification degree of said variable amplifying means due to change of said amplification degree; and
noise detecting means for detecting either the changing rate or magnitude of noises contained in said signal voltage so that the amplification degrees of said variable amplifying means and said compensating means are controlled with the output of said noise detecting means.

10. The flow meter of claim 1, further comprising
rate limiting means connected between said first demodulating means and said high pass filtering means, for limiting the fluctuations of said signal voltage to be within a predetermined range.

11. The flow meter of claim 1, further comprising
noise detecting means for detecting the instant when noises contained in said signal voltage fall within a predetermined allowable range to output a time constant control signal for reducing the time constants of said high pass filtering means and said low pass filtering means when in a normal return, and subsequently increasing said time constants; and
time constant changing means for changing the time constants of said high pass filtering means and said low pass filtering means with said time constant control signal.

12. The flow meter of claim 1, further comprising
a power supply detector for detecting the instant when a power supply is made to output a time constant control signal for reducing a time constnat for a predetermined time period from the power supply switching instant; and
time constant changing means for changing the time constants of said high pass filtering means and said low pass filtering means with said time constant control signal.

13. The flow meter of claim 1, comprising a microcomputer for arithmetically operating said first demodulating means, said high pass filtering means, said second demodulating means, said low pass filtering means, and said composing means.

14. An electromagnetic flow meter for metering the flow rate of a fluid by applying a magnetic field thereto, comprising
exciting means for supplying a magnetic field having a first frequency and a second lower frequency to produce a signal voltage according to the flow rate;
signal processing means for discriminating the signal voltage on the basis of said first frequency and for producing an output first signal;
zero detecting means for taking a deviation between a voltage associated with said output first signal and a second frequency component of said signal voltage to detect it as a zero signal; and
zero correcting means for correcting said flow rate signal with said zero signal.

15. An electromagnetic flow meter for metering the flow rate of a fluid by applying a magnetic field thereto, comprising
exciting means for supplying a magnetic field having a first frequency and a second lower frequency to produce a signal voltage according to the flow rate;
second demodulating means for discriminating and outputting the signal voltage on the basis of said second frequency;
low pass filter means for low pass filtering an output from said second demodulating means;
first demodulating means for discriminating and demodulating said signal voltage with said first frequency;
response detecting and amplifying means for detecting a deviation between an output from said first demodulating means and an output from said low pass filter means; and
response correcting means for calculating the difference between a response compensating signal and an output of said low pass filter, said response compensating signal being obtained by passing an output from said response detecting and amplifying means through a high pass filter.

16. An electromagnetic flow meter for metering the flow rate of a fluid by applying a magnetic field thereto, comprising
exciting means for supplying a magnetic field having a first frequency and a second lower frequency to produce a signal voltage according to the flow rate;
demodulating means for discriminating and outputting the signal voltage on the basis of said second frequency;
low pass filter means for low pass filtering an output from said demodulating means;
response detecting and amplifying means for amplifying a deviation between a voltage representing a flow rate and said signal voltage; and
response correcting means for responding to and correcting a response compensating signal obtained by demodulating an output signal from said response detecting and amplifying means on the basis of said first frequency, and for responding to and correcting an output signal from said low pass filter means so that a signal associated with an output signal from said response correcting means is outputted as said flow rate signal voltage.

17. An electromagnetic flow meter for metering the flow rate of a fluid by applying a magnetic field thereto, comprising
exciting means for supplying a magnetic field having a first frequency and a second lower frequency to produce a signal voltage according to the flow rate;
first demodulating means for discriminating the signal voltage on the basis of said first frequency to generate a first output;
second demodulating means for discriminating and demodulating said signal voltage on the basis of said second frequency; and
low pass filter means for low pass filtering an output from said second demodulating means with a large time constant to generate a second output, whereby a flow rate output is generated by executing a predetermined set of operations with said first and second outputs.

* * * * *